(12) United States Patent
Breskvar

(10) Patent No.: US 12,130,951 B2
(45) Date of Patent: *Oct. 29, 2024

(54) SYSTEMS AND METHODS FOR DATA-DRIVEN SECURE AND SAFE COMPUTING

(71) Applicant: Beyond Semiconductor, d.o.o., Ljubljana-Crnuce (SI)

(72) Inventor: Matjaz Breskvar, Ljubljana-Crnuce (SI)

(73) Assignee: BEYOND SEMICONDUCTOR, D.O.O., Ljubljana-Crnuce (SI)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,951

(22) Filed: Mar. 31, 2023

(65) Prior Publication Data
US 2023/0244818 A1  Aug. 3, 2023

Related U.S. Application Data

(63) Continuation of application No. 16/919,934, filed on Jul. 2, 2020, now Pat. No. 11,645,425.

(60) Provisional application No. 62/870,526, filed on Jul. 3, 2019.

(51) Int. Cl.
G06F 21/00 (2013.01)
G06F 21/57 (2013.01)
G06F 21/64 (2013.01)

(52) U.S. Cl.
CPC ............ *G06F 21/64* (2013.01); *G06F 21/577* (2013.01); *G06F 2221/034* (2013.01)

(58) Field of Classification Search
CPC ... G06F 21/64; G06F 21/577; G06F 2221/034
USPC ............................................................ 726/1
See application file for complete search history.

(56) References Cited

U.S. PATENT DOCUMENTS

| 5,608,861 | A  | * | 3/1997  | Mead ..................... G06T 11/206 715/700 |
| 7,590,644 | B2 | * | 9/2009  | Matsakis .................... G06F 8/41 715/239 |
| 8,958,475 | B2 | * | 2/2015  | Raveendran ........... H04H 60/41 375/240.1 |
| 10,037,187 | B2 | * | 7/2018  | Akidau ..................... G06F 7/00 |
| 11,165,428 | B1 | * | 11/2021 | Ross ....................... H03K 19/21 |
| 11,165,753 | B1 |   | 11/2021 | Kawale |
| 11,645,425 | B2 |   | 5/2023  | Breskvar |
| 11,755,720 | B2 |   | 9/2023  | Seksenov |
| 2011/0066602 | A1 | * | 3/2011 | Studer ................... G06F 40/226 707/690 |

(Continued)

OTHER PUBLICATIONS

International Preliminary Report on Patentability (IPRP) issued by the International Bureau of WIPO for PCT Application No. PCT/IB2022/054302, mailed Nov. 23, 2023, 16 pages.

(Continued)

*Primary Examiner* — Josnel Jeudy
(74) *Attorney, Agent, or Firm* — Sprinkle IP Law Group

(57) ABSTRACT

System and methods for the processing of data in a secure and safe manner are disclosed. Embodiments of such system and methods may ensure the operation of policies in a manner that is dependent on the inherent properties of the data being operated on as well as the operations that are performed on that data.

18 Claims, 18 Drawing Sheets

(56) References Cited

U.S. PATENT DOCUMENTS

2011/0302397 A1* 12/2011 Mitola, III ............. G06F 9/524
                                                              712/241
2019/0391971 A1* 12/2019 Bernat ................. H04L 9/0637
2021/0084038 A1   3/2021 Feasel
2021/0150020 A1   5/2021 Lewis
2021/0240818 A1   8/2021 Seksenov

OTHER PUBLICATIONS

Notice of Allowance for U.S. Appl. No. 17/740,154, mailed Aug. 28, 2024, 9 pgs.

* cited by examiner

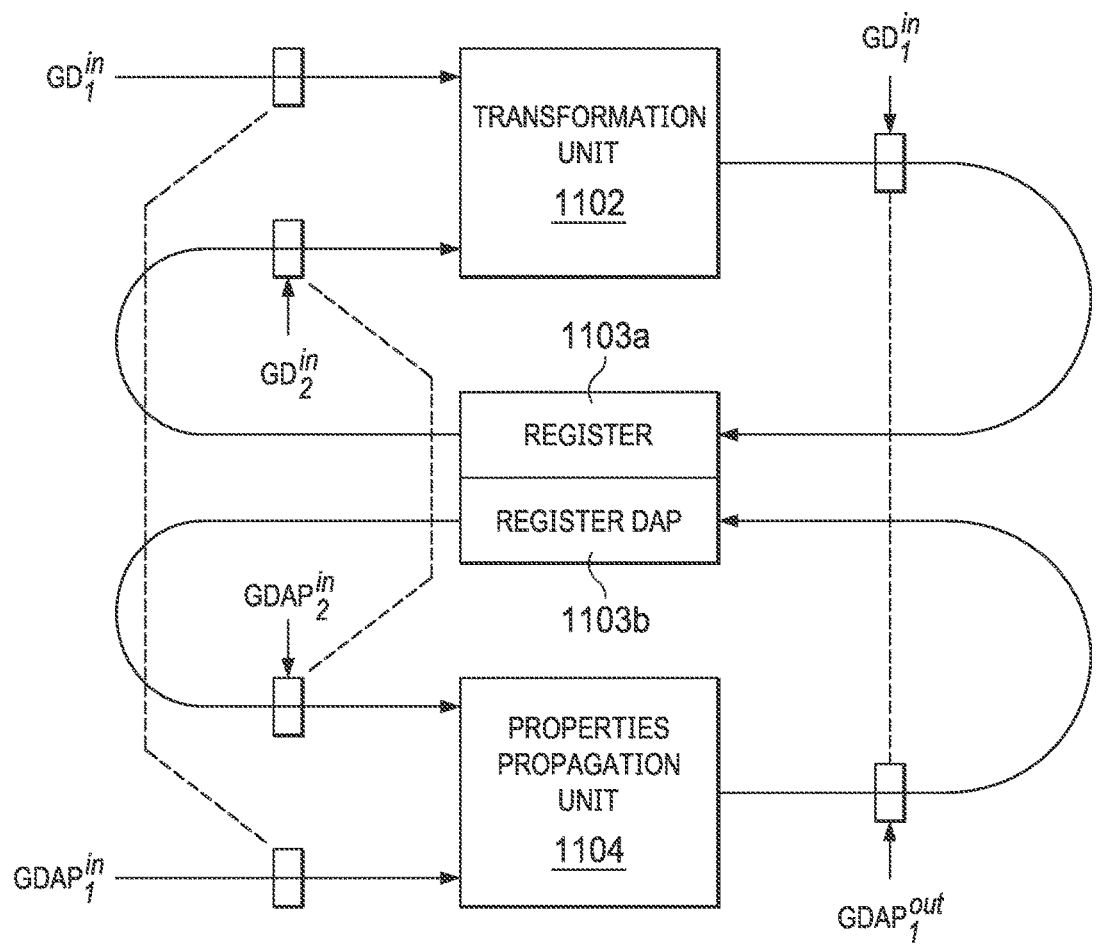
FIG. 11
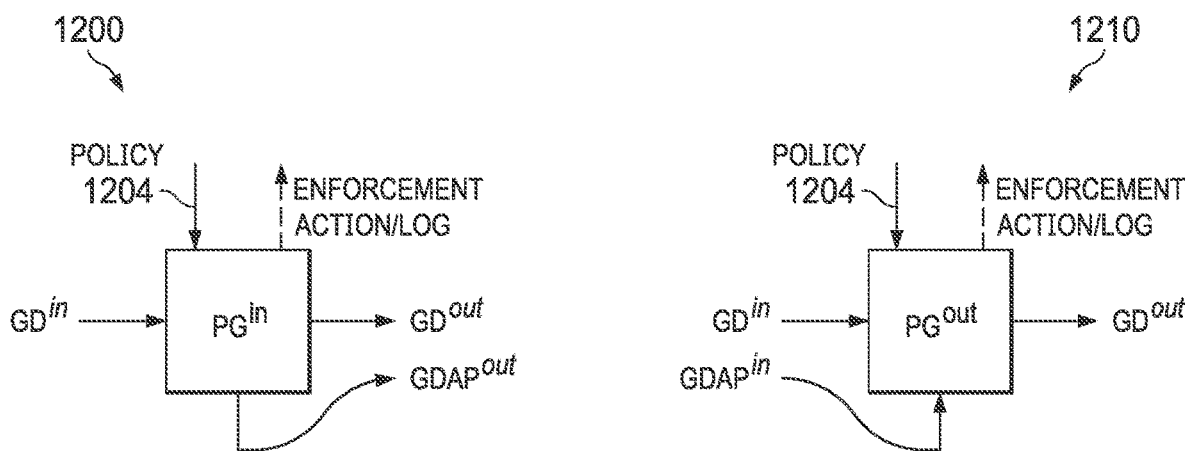
FIG. 12A
FIG. 12B

SYSTEMS AND METHODS FOR DATA-DRIVEN SECURE AND SAFE COMPUTING

CROSS-REFERENCE TO RELATED APPLICATION(S)

This application is a continuation of, and claims a benefit of priority under 35 U.S.C. 120 of the filing date of U.S. patent application Ser. No. 16/919,934, filed on Jul. 2, 2020, issued as U.S. Pat. No. 11,645,425, entitled "SYSTEMS AND METHODS FOR DATA-DRIVEN SECURE AND SAFE COMPUTING," which claims the benefit of priority under 35 U.S.C. § 119(e) of U.S. Provisional Patent Application No. 62/870,526 filed Jul. 3, 2019, entitled "Systems and Methods for Data-Driven Secure Computing," the entire contents of which are hereby expressly incorporated by reference for all purposes.

TECHNICAL FIELD

This disclosure relates generally to the field of computer security. More specifically, the disclosure relates to embodiments of systems and methods for hardware based secure computing architectures. Even more particularly, embodiments of this disclosure relate to hardware security architectures that allows arbitrary code or data to be independently secured.

BACKGROUND

Existing secure processing techniques for computer processing hardware or software, such as tamper-resistant "Secure Elements" or "Hardware Security Module" (HSM) based designs, are mostly dependent on their constrained capabilities as well as by placing hard constraints on data memory space accesses. In other words, these designs are considered mostly secure simply because there are only a very limited number of functions that they can accomplish, and a limited amount of data that they can process. By constraining the operations that may be executed to a small subset of the universal Turing machine computational model and by placing hard limits on the memory space that may be accessed, the security (e.g., the proof of the security) for these systems can be made more credible, since the total solution space can be nearly exhaustively evaluated. However, even some of these very tightly-constrained secure systems have been shown to have serious vulnerabilities under certain circumstances.

More advanced, more general implementations of these kinds of secure processing concepts include arbitrary code segment execution in segmented memory spaces. Examples of such architectures include Arm's TrustZone™, Intel's SGX™ or AMD's PSP architectures. While these approaches may support more general execution options than the Secure Element designs mentioned earlier, this additional flexibility comes along with an associated increase in the difficulty of assessing, or proving, their security. The security of such systems is mainly based on the ability of the system to limit the available memory to a given secure process or secure operational thread. Such systems are frequently exploited by clever manipulation of their segmented memory controller mechanisms. Unfortunately, since the system memory controller is such a low-level element in most high-level designs, some of these vulnerabilities have proven highly difficult to detect, not to mention correct.

All of these technologies are thus variations of the same basic model; that of fixed perimeter security. This idea of a secure "barrier" inside which system security can be "guaranteed" by controlling the data that can cross the barrier (in either direction) is ultimately based on the archaic concept of physical security practice. The general idea is that if the border across which data must cross can be controlled, you can control the interior (e.g., the secure area), but that principle simply does not work in the longer term. That is, if a given vulnerability is present in a system when it is put into service, then the longer the system stays in service, the more likely it is that the vulnerability will be found. This is due to such a system's inherent inability to adapt to compromises in real time. In other words, unless a vulnerability is discovered, it cannot be fixed. Such "undiscovered weaknesses" even have a widely-recognized name; Zero-Day vulnerabilities.

What is desired, then, are improved systems and methods for security in computing processing device.

SUMMARY

To those ends, among others, attention is now directed to embodiments and systems and methods presented herein that allow for the security of data (e.g., code or other data) utilized in (or output from) a processing block (e.g., a set of processing hardware or logic or associated code). Such a processing block (also referred to herein as a transformation block or unit) may perform a transformation (e.g., processing) on incoming data (or a datum) supplied to the transformation unit to produce a data (or a datum) output. Such incoming data may be associated with one or more properties (e.g., data associated properties or DAP's) that may designate one or more composable properties about corresponding input data provided to the transformation block.

These DAP's may be provided to a properties propagation block (unit). The properties propagation unit comprises logic for determining an output DAP associated with a corresponding data output generated by the transformation unit, where the output DAP was generated based on an input DAP associated with the input data from which the corresponding data output was generated by the transformation unit. To put it in a different manner, in embodiments, for each determination of output data through application of the transformation unit on the corresponding input data, there is a corresponding determination of the output DAP by the properties propagation unit such that the output DAP corresponds to the input DAP that is associated with such input data.

Such a properties propagation unit may provide such output DAP's for corresponding output data from the transformation unit substantially regardless of the actual processing or transformation applied by the transformation unit. Thus, systems and methods as disclosed may be usefully utilized on almost any arbitrary complex processing or transformation unit to provide output DAP's associated with data output by the transformation unit.

These data properties may include properties such as confidentiality, integrity, quality, availability, freshness, risk or almost any other property of data desired. Thus, by having DAP's associated with data output by the transformation unit (e.g., based on the corresponding input data associated properties associated with input data from which the output data was generated), a number of security measures may be implemented. Such measures may include the application of input security policies or output security policies using perimeter guard logic.

These perimeter guards may include input perimeter guards and output perimeter guards. Input perimeter guards may receive input data and a policy. Based on the policy and the input data, an input perimeter guard may produce a output data and corresponding DAP. In this manner, input perimeter guards may be utilized, for example, as enforcers or gates for data input to a processing system (e.g., a transformation unit or associated properties propagation unit). For example, input perimeter guards may take as input data retrieved, accessed, or input, from devices or media of a computing system and determine (e.g., based on a user policy associated with the data or input source) whether to provide such data to the transformation unit, what of such data should be provided to the transformation unit, or what the corresponding DAP for that input data should be. The input perimeter guard may also determine an enforcement action to assure that such actions (or other actions) are taken or the associated policy is enforced.

Similarly, embodiments of output perimeter guards may receive input data, a corresponding DAP, and a policy. Based on the policy (and potentially the DAP), an output perimeter guard may produce a corresponding output data for the received input data. In this manner, output perimeter guards may be utilized, for example, as enforcers or gates for data output from a processing system (e.g., a transformation unit or associated properties propagation unit). For example, output perimeter guards may take as input data output from the transformation unit and the corresponding DAP output from the properties propagation unit and determine whether to provide that data to an output device (e.g., to output such data on a network, store such data on a storage media, etc.). Embodiments of an output perimeter guard may also determine an enforcement action to assure that such actions (or other actions) are taken, or the associated policy is enforced.

Accordingly, embodiments may utilize a properties propagation unit in association with a transformation unit (e.g., a CPU or the like) of a computing system along with zero or more input perimeter guards or output perimeter guards to enforce one or more user policies on both code and/or data utilized during processing of the computing system as well as the data leaving such a computing system.

It will be noted here that the terms input data, input DAP, output data and output DAP are to be taken as descriptive relative to the local block or unit with which the term is used and not as generally applicable, as the output (e.g., data or data associated property) of one block or unit may be utilized as the input (e.g., data or DAP) to another block or unit.

As can be seen then, in contrast with the limitations of prior processing security systems, embodiments described herein may take a radically different approach. Such approaches may involve a real-time evaluation of a given security policy on a set of (e.g., each and every) datum present in the system during a set of (e.g., every) operations. Essentially, embodiments may utilize an extra (e.g., security-related) data field (e.g., the DAP's) added to each and every datum (or memory location) in the system. This supplemental (e.g., security) data field may be used to evaluate (effectively in real time) the consequences of performing any operation on any datum—as resolved against the security policy that is in effect as these operations are executed. This results in an update of each (e.g., security) data field (i.e., the DAP) for each datum every time an operation occurs on that datum.

To illustrate, one familiar analogue to embodiments that may be employed strictly for purposes of explanation is that of data parity, where each memory or storage location has an attendant auxiliary data field that allows the main data to be verified as correct—or in some erroneous cases, may allow the main data field to be corrected (i.e., transformed) based on the combination of the information stored in the main and auxiliary data fields. As such, the overhead required to accomplish this kind of supplemental data field may be ascertained. Embodiments, however, may employ an effective and efficient method for implementing such a system that, significantly, may result in highly advantageous implications for the security (e.g., and proofs of this security) for such a system.

Thus, embodiments may include systems for a secure computing paradigm where the output of this system is dependent on not just the contents or source of the input data, but on both of these as well as on a well-defined security policy. We refer to such a system as data driven secure computing and it is comprised of a computing system including a transformation unit and a properties propagation unit that may be distinct from the transformation unit. The transformation unit includes first logic for processing input data by applying a transform to the input data to generate an output datum corresponding to an input datum of the input data received at the transformation unit. A common example of such a transformation unit is a Central Processing Unit or CPU, and on different hierarchical level the Arithmetic Logic Unit or ALU of a CPU. In this data-driven secure computation model, however, each and every input datum received at the transformation unit may have a corresponding input DAP distinct from that input datum but nonetheless specific to that input datum.

The properties propagation unit may include second logic for receiving the input DAP corresponding to the input datum received at the transformation unit and generate an output DAP corresponding to, and synchronized with, the output datum generated by the transformation unit by applying a relation to the input DAP. The relation is based on a policy defining a composability rule associated with the input data associated property. This relation may or may not be based on the transform applied by the transformation unit.

In one embodiment, the DAP may comprise a data confidentiality level or a data integrity level.

In some embodiments, a set of input data (or datums) may be received at the transformation unit and a set of output data may be generated by the transformation unit by applying the transform to generate each of the set of output datums based on the set of input datums. Each of the set of input datums may have corresponding input DAP's distinct from that input datum and specific to that input datum, where each of the corresponding input DAP's for each of the set of input datums is provided to the properties propagation unit. The properties propagation unit can generate a set of output DAP's comprising each output DAP corresponding to each of the set of output datums generated by the transformation unit.

In certain embodiments then, internal state logic, such as a register or the like, may store at least one of the set of output datums generated by the transformation unit and at least one of the corresponding output DAP's generated by the properties propagation unit, and provide at least one subsequent input datum to the transformation unit and at least one subsequent input DAP corresponding to the provided at least one subsequent input datum to the properties propagation unit.

An input datum for the transformation unit may also comprise a set of instructions for the transformation unit, including instructions that alter the operation (or transform) that the transformation unit applies to the input data or the instructions themselves.

In one embodiment, one or more input datum of the set of input datums may be based on data from a device coupled to the computing system.

Some embodiments may include an input perimeter guard disposed between such a device and the transformation unit and between the device and the properties propagation unit, wherein the input perimeter guard comprises logic for receiving data from the device and determining both the input datum and the input DAP corresponding to the input datum based on a first policy, which may be specific to the device. The logic of the input perimeter guard may also be adapted for generating a first enforcement action based on the first policy.

In certain embodiments, the input perimeter guard comprises logic for an input filter to apply to the data from the device to generate the output datum. The input filter may, for example, use a key to decrypt the data from the device.

Some embodiments may include an output perimeter guard disposed between the device and the transformation unit and between the device and the properties propagation unit, wherein the output perimeter guard comprises logic for receiving the output datum from the transformation unit and the output DAP corresponding to the output datum from the properties propagation unit and determining data to provide to the device based on the output datum, the corresponding output DAP corresponding to the output datum and a second policy that may be specific to the device. Such an output perimeter guard may also comprise logic for generating a second enforcement action based on the second policy.

Accordingly, embodiments herein outline advancements in the area of hardware or software logic to enable novel mechanisms for the processing of data in a secure and safe manner. One of the foundational concepts of embodiments thus involves a rethinking of how to perform generalized policy enforcement. Embodiments of this new approach may be accomplished by using a mechanism (e.g., a perimeter guard) that ensures the proper operation of security or functional safety related or even other, more general policies in a manner that is dependent on the inherent properties of the data being operated on as well as the operations that are performed on that data.

Embodiments can thus be contrasted with the more traditional method of security or functional safety policy implementation, where the security or functional safety of a system is defined only by the structure and operation of the code that is manipulating its data or the location in memory of such code or such data. With embodiments of this data-dependent computational model as disclosed herein, any generalized policy implementation, as well as its associated proof guarantees, can be made much simpler and more direct. This allows security (e.g., and corresponding proofs) to be more easily implemented or constructed and enables more general and more robust security and functional safety implementations than that which is available on systems using traditional functional safety and secure processing methodologies.

Specifically, modern day high assurance systems need to take into account both functional safety and security challenges. Embodiments as disclosed herein are unique in that they may simultaneously addresses both of these challenges and needs in a way that enables formal (e.g., mathematical) system guarantees at a fraction of the effort that is required for traditional high assurance architectures. When implemented in association with a given processor (e.g., CPU or transformation unit) design, embodiments can provide guarantees that software will adhere to an arbitrary high level functional safety, security or other policy at substantially all times. Thus, a one-time investment in a formal proof of the correctness of such processor implementation can translate to high-assurance guarantees of arbitrary functional safety, security or other policy enforcement with any software executing on that processor.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 11 is a block diagram depicting a computing system according to an embodiment.

FIG. 12A is a block diagram depicting an embodiment of an input perimeter guard.

FIG. 12B is a block diagram depicting an embodiment of an output perimeter guard.

DETAILED DESCRIPTION

Figure 1B:
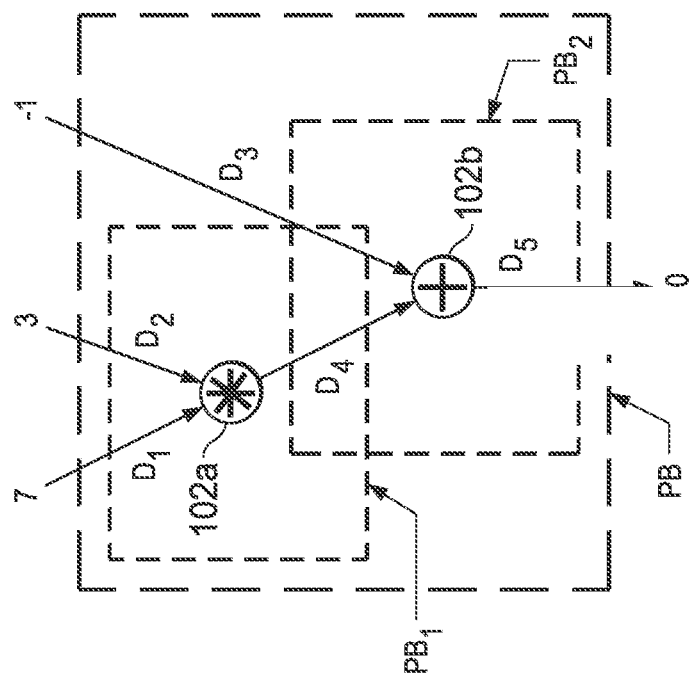
FIGS. 1A and 1B are block diagrams depicting examples of data flow graphs.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As discussed above, attention is now directed to embodiments and systems and methods presented herein that allow for the security of data (e.g., code or other data) utilized in a processing block (e.g., a set of processing hardware or logic or associated code). Such a processing block (also referred to as the transformation block or unit) may perform a transformation (e.g., processing) on incoming data (or a datum) supplied to the transformation unit to produce a data output (or an output datum). Such incoming data may be associated with one or more data associated properties (or DAPs) that may designate one or more composable properties about the corresponding input data (or datum) provided to the transformation block.

The DAP's may be provided to a properties propagation block (unit). The properties propagation unit comprises logic for determining an output DAP associated with a corresponding data output generated by the transformation unit, where the output DAP was generated based on an input DAP associated with the input data from which the corresponding data output was generated by the transformation unit. Thus in some embodiments, for each determination of output data through application of the transformation unit on the corresponding input data, there is a corresponding determination of the output DAP by the properties propagation unit such that the output DAP corresponds to the input DAP that is associated with such input data.

Such a properties propagation unit may provide such output DAP's for corresponding output data from the transformation unit, substantially regardless of the actual processing or transformation applied by the transformation unit. Thus, systems and methods as disclosed may be usefully utilized on almost any arbitrary complex processing or transformation unit to provide output DAP's associated with data output by the transformation unit.

These DAP's may include properties such as confidentiality, integrity, quality, availability, freshness, risk. Thus, by having output DAP's associated with data output by the transformation unit (e.g., based on the corresponding input DAP's associated with input data from which the output data was generated), a number of security or safety measures may be implemented. Such measures may include the application of input security policies or output security policies using perimeter guard logic.

As can be seen then, embodiments as described herein may take a radically different approach than prior processing security systems, with their well-known limitations. Such new approaches may involve a real-time evaluation of a given (e.g., security) policy on a set of data (e.g., each and every datum) present in the system during a set of (e.g., every) operations. Essentially, embodiments may utilize an extra (e.g., security-related) data field (e.g., the DAP's) added to each and every datum (or memory location) in the system. This supplemental (e.g., security) data field may be used to evaluate (effectively in real time) the consequences of performing any operation on any datum—as resolved against the (e.g., security) policy that is in effect as these operations are executed. This results in an update of each (e.g., security) data field for each datum every time an operation occurs on that datum.

However, before delving into embodiments in more detail, some additional context of embodiments may be useful. Data processing is essentially the practice of applying a certain transformation to input data, resulting in output data. In principle, the resulting output data thus depends on the input data, and this relationship between the input and the output data can thus be referred to as a set of data dependencies.

Many data processing blocks (e.g., hardware logic), comprising data inputs, data transformations and data outputs can often be broken down into multiple, simpler data processing blocks that are also comprised of inputs, transformations and outputs (although not necessarily the same number and type of inputs, outputs and transformations). When such simplified processing blocks' inputs and outputs are appropriately connected, they can be shown to be equivalent to the original higher-level data processing block. The structure of such a connection of simplified data processing blocks and the connections between their outputs and inputs can be presented with a data flow graph or a data (flow) dependency graph.

In fact, any generalized data processing operation can be described by such a data flow graph. In the case of a Central Processing Unit (CPU) a data flow graph is usually not static. Moreover, even different executions of the same program by the CPU may result in different data flow graphs, since the execution of the program often depends on both internal and external factors, such as data input values, the timing or order of arrival of different inputs, etc. Thus, whether the data flow is static or dynamic with complex control flow may or may not be material. What is significant is that a data flow graph accurately captures the dependencies that are relevant for each specific case (e.g., each use case for a particular data block).

From a data dependency graph, it may thus be clear (at least in principle) which transformations, and their inputs (and so on recursively) influence the output of a given transformation. These recursive dependencies (i.e., the dependencies, the dependencies of dependencies, and so on) are referred to as the dependency cone. How far and how deep the dependency cone goes will depend on the context. In the vast majority of cases, the starting time, the events included, and the scope of a dependency cone are all context dependent.

The decomposition of higher-level blocks into smaller blocks is possible in multiple hierarchical levels and along different (often intertwined) dimensions. One example of such a dimension includes time. For example, compare the operation of two different implementations of the same numerical divider procedure. In one version, each circuit clock cycle may produce a single-bit intermediate result. In another version (or implementation) of the same high-level transformation, a monolithic divider circuit may also produce partial results each clock cycle, but nonetheless not expose the final result until the operation is complete.

Additionally, this complete result may not be produced in a constant amount of time, since the overall execution time may potentially depend on the input data.

Another option for such an operational decomposition includes the complexity of a transformation. For example, a high-level vector multiply-and-accumulate operation may be broken into separate multiply-and-accumulate operations then further into separate multiplications and additions, and further into gates, transistors, etc. Yet another hierarchical decomposition example includes most software, where high-level libraries can be broken down into individual functions, which can be further broken down into individual instructions, each of which can potentially be broken down into individual logical operations, etc.

Figure 1A:
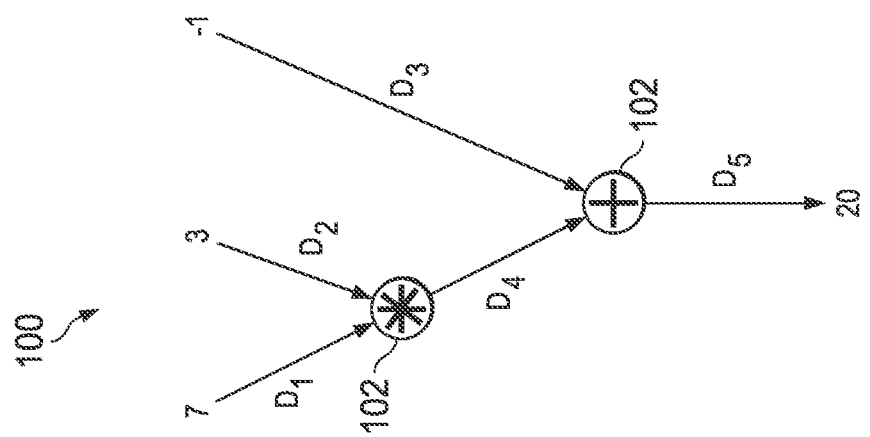

FIGS. 1A and 1B depict examples of such data flow graphs for a simple processing block. In FIG. 1A for example, a data flow graph 100 is presented with marked dependencies. The $D_1$ and $D_2$ dependencies are inputs into one transformation 102 (a multiplication transformation denoted "*") and thus dependencies of this transformation result in the output $D_4$. $D_4$ and $D_3$ are inputs into the second transformation 102 (an addition transformation denoted "+") and thus represent dependencies of the $D_5$ output from the "+" transformation 102.

In FIG. 1B, a breakdown of the dependency graph of FIG. 1A is depicted. Here, three processing blocks (PB, $PB_1$ and $PB_2$) are illustrated on two hierarchical levels. The PB processing block has inputs $D_1$, $D_2$ and $D_3$, a transformation that comprises the two transformations 102 (denoted "*" and "+"), and the PB output, marked as $D_5$. The PB processing block can be broken down to two processing blocks, $PB_1$ and $PB_2$. The $PB_1$ processing block has inputs $D_1$, $D_2$, a transformation 102a (denoted "*"), and the $PB_1$ output, marked as $D_4$. The $PB_2$ processing block has inputs $D_3$, $D_4$, a transformation 120b (denoted "+"), and the $PB_2$ output, marked as $D_5$. The PB processing block can be constructed from $PB_1$ and $PB_2$ by creating the appropriate connections (as depicted). Note here that $D_1$, $D_2$, $D_3$ and $D_4$ are all in the "dependency cone" of $D_5$. However, the immediate dependencies of $D_5$ can be seen to include only $D_3$ and $D_4$.

Accordingly, data that is processed by processing blocks may, according to embodiments, have data associated properties (or DAP's). A DAP is an indication, signal or identifier of a property (or a value of a property) of a datum. For purposes of this disclosure, it is convenient to refer to DAP's as a collection of composable properties of the data to which they are associated. For example, confidentiality, integrity, quality, availability, freshness, risk, etc. are all examples of such composable properties. In general, properties are referred to as composable if it is possible to combine multiple such properties into a conjoined property, according to pre-determined composability rules.

For example, consider that a new document (a reference which may also be interchangeably utilized herein to also apply to general data) is created somehow from a set of existing documents, where the existing documents include a mixture of data with the following associated properties: high confidentiality (HC), medium confidentiality (MC) and low confidentiality (LC). Without needing to know anything about how the new document is created or how the source documents were combined, a valid conclusion can nevertheless be reached (at least from the most conservative perspective) regarding the confidentiality property of the new document resulting from the combination of the existing documents. In the most conservative case (e.g., unless we know that no HC data was used in creation of the new document), it can be concluded that the new document should be classified as HC (i.e., its confidentiality property should have the value HC) as at least one of the documents combined to form the new document included HC data. It is, of course, possible that the "HC" data is not used in the construction of the new document, and even if that is the case, the only consequence is that the "HC" determination is overly conservative. Note that a (conservatively) valid conclusion can be reached about the confidentiality of the new document without needing to know anything more than: (1) knowing the data associated properties (DAP's—which may be taken herein to refer to a set of data associated properties) of the input source data (e.g., the input dependencies), in this case the existing documents, and (2) understanding the composition of the confidentiality property (i.e., knowing the compositional rules of the confidentiality property).

In the example above, the source (input) data (documents) were transformed into resulting (output) data (documents) in an arbitrary and possibly even unknown manner. Irrespective of the details of this transformation, the (most conservative interpretation of the) confidentiality of the output data can be determined by simply applying the compositional rules of the confidentiality property to the confidentiality properties of the input data.

The reasoning behind this determination is that since the output data (e.g., document) is derived from input documents, the output data properties (DAP's) must therefore be determined by some relation to the input data properties (DAP's). The rule that output DAPs must be determined in relation to the input DAP's is the composition rule—or properties propagation rule (as will be discussed).

Thus, the rules of (data associated) property composition can be described by defining the relations between the (data associated) properties and by observing the rule that the combined properties must be based on—or in relation to— all of the properties that were combined. For example, suppose HC (high confidentiality) is considered greater-than-or-equal to ($\geq$) the MC (medium confidentiality), which is in turn greater-than-or-equal to ($\geq$) LC (low confidentiality). In this example, the data associated properties are HC, MC, LC—more formally—are elements of set S={HC, MC, LC}. So it can be asserted that HC is in greater-than-or-equal-to relation with MC, and MC is in greater-than-or-equal-to relation with LC. Thus, combining data (e.g., documents) with HC and MC data associated properties will, according to the rule, result in data with HC data associated properties, because HC is in the afore-mentioned relation with MC.

If a relation is transitive and if such a composition rule is applied during multiple transformations, it will result in a final combined property that is in relation with all of the data associated properties of dependencies throughout the entire data dependency cone (e.g., of a transformation or processing unit).

The DAP's and the composition rules may be simple, like in the confidentiality example above, and can thus be modeled as elements of a set with transitive and antisymmetric (often also reflexive) binary relations. Of course, some situations may not be so simple and the relation can be much more complex, in general a k-ary relation (or simply a relation).

As an example of a complex relation, suppose a DAP "risk" takes values of HR (high risk), MR (medium risk) and LR (low risk). As may be realized, data associated with a "risk" DAP may also have other DAP's, such as confidentiality (as defined above) or integrity (e.g., an identifier of how trustworthy the data may be). The risk relation could thus be defined such that if confidentiality increases and integrity decreases at the same time then HR is in relation with MR.

The definition of such DAP's and k-ary relations may thus be application-specific. In principle, the DAP is arbitrary and may also include all the data itself or data properties that are associated with the data dependency cone (e.g., of a processing block), either in-part or in-full. In the security and functional safety fields, such a system can be evaluated with (potentially multiple) simple binary relations. For clarity, the following set of properties more precisely describes possible realizations using binary relations—without precluding systems with more complex k-ary relations or systems with other binary relations:

1) Values of the data associated properties (DAP's) are elements of set S.
2) There exists a relation R between elements of set S with the following properties (these are not necessarily always needed, but are often useful):
   a) antisymmetry: $\forall a, b \in S$: (a R b)$\wedge$(b R a)$\Rightarrow$a=b, if an element a is in relation with element b and the element b is in relation with element a then the elements are the same.
   b) transitivity: $\forall a, b, c \in S$: (a R b)$\wedge$(b R c)$\Rightarrow$R if an element a is in relation with the element b and the element b is in relation with element c then element a is in relation with element c.
3) The output data associated properties are determined such that for $DAP^{out}$ is in relation with all of the input data associated properties $DAP_i^{in}$, more specifically that the following formula F holds: ($DAP^{out}$ R $DAP_1^{in}$)$\wedge$($DAP^{out}$ R $DAP_2^{in}$)$\wedge$ ... $\wedge$($DAP^{out}$ R $DAP_n^{in}$), where "$\wedge$" is logical "and", and R is a relation, as defined above.

Note that respect to the above that in order to guarantee that $DAP^{out}$ can always be determined the set S should contain the "join" element M, such that M is in relation with each of elements of S, specifically $\forall a \in S$: M R a. Note also that an implementation of the system without the "join" element is possible and can be useful. In such a case, when the formula F cannot be satisfied, the system can assign a predetermined value to $DAP^{out}$, or trigger some predefined action, such as an exception, stop of computation, etc. Note as well that any $DAP^{out}$ that fulfills the above condition may be acceptable. However, it may be beneficial in certain cases (e.g., not to be overly conservative) that the "lowest" is selected. More precisely, if multiple $DAP_1^{out}$, $DAP_2^{out}$, ..., $DAP_m^{out}$ satisfy the formula F then $DAP_{lowest}^{out}$ is the "lowest" among them if $DAP_{lowest}^{out}$ is at most in relation with itself.

To illustrate an example, suppose the data associated properties are elements of the set S={0, 1, 2, 3, 4, 5} and that the relation R is greater-than-or-equal-to "$\geq$". If n=3 (there are 3 input data associated properties) and $DAP_1^{in}$=0, $DAP_2^{in}$=0, $DAP_3^{in}$=2, then $DAP^{out}$ satisfying the above condition may be 2, or 3, or 4, or 5. Any of these will result in working system, but choosing $DAP^{out}$ not to be 2 may result in over conservatism. Now suppose that data associated property 0 means lowest confidentiality and 5 the highest confidentiality. Data comprised of inputs of confidentiality 0 and 2 can be labeled as having a data associated property (DAP) of 2, but also 3, 4, or 5 would not result in in under classification. Clearly, the over conservatism may often not be desired.

It will thus be realized that equivalent operation of a system can be achieved by assigning different meanings to the data associated properties (DAP's) and changing the relation appropriately. For example, consider two systems, system A and system B. In system A suppose data associated properties are elements of set S={0, 1, 2, 3, 4, 5}, where 0 means lowest confidentiality and 5 the highest, and the relation R is greater-than-or-equal-to "$\geq$". In system B suppose data associated properties are elements of set S={0, 1, 2, 3, 4, 5}, where 0 means highest publicity and 5 the lowest, and the relation R is less-than-or-equal "$\leq$". By mapping the data associated property 0 of system A into 5 of system B, and 1 of system A into 4 of system B and so forth, and by mapping the relation greater-than-or-equal-to "$\geq$" of system A to relation less-than-or-equal "$\leq$" of system B, (and assuming everything else of system A and B are equal or of no impact), it is clear that system A and system B can be shown to result in equivalent behavior.

According to the above discussion then, a property (P1) can be defined whereby if the relation R additionally fulfills the reflexivity property: $\forall a \in S$: a R a, then there may exist one $DAP_i^{in}$ which is in relation with itself and all the other $DAP_k^{in}$ and thus, if assigned to $DAP^{out}$, the $DAP^{out}$ will comply with formula F and minimize conservatism. In many embodiments, implementation of a system that minimizes conservatism may be preferred.

It may be useful here to illustrate some examples of this property P1. Suppose first that the relation R is greater-than-or-equal-to "$\geq$", then the above Property P1 is fulfilled for the relation R and: if $DAP^{out}$=MAX($DAP_1^{in}$, $DAP_2^{in}$, ..., $DAP_n^{in}$) then ($DAP^{out} \geq DAP_1^{in}$)$\wedge$($DAP^{out} \geq DAP_2^{in}$)$\wedge$ ... $\wedge$($DAP^{out} \geq DAP_n^{in}$) thus satisfying the formula F. Since the MAX function can be efficiently implemented (e.g., in processing logic), this is one possible efficient way of an embodiment of the system (or portions thereof).

Suppose now that the relation R is less-than-or-equal "$\leq$", then the above property P1 is fulfilled for such a relation R and: if $DAP^{out}$=MIN($DAP_1^{in}$, $DAP_2^{in}$, ..., $DAP_n^{in}$) then ($DAP^{out} \leq DAP_1^{in}$)$\wedge$($DAP^{out} \leq DAP_2^{in}$)$\wedge$ ... $\wedge$ ($DAP^{out} \leq DAP_n^{in}$) thus satisfying the formula F. Since the MIN function can be efficiently implemented (e.g., in logic), this is another possible efficient way of implementing an embodiment of the system (or portions thereof).

As another example, suppose the data associated properties are elements of set S={0, 1, 2, 3, 4, 5}, where 0 means lowest confidentiality and 5 the highest, and the relation R is greater-than-or-equal-to "$\geq$". Here, the $DAP^{out}$ that complies with formula F can be efficiently determined by calculating the MAX function of the input data associated properties. If, for instance, n=3 (there are 3 input data associated properties) and $DAP_1^{in}$=0, $DAP_2^{in}$=0, $DAP_3^{in}$=2, then $DAP^{out}$ satisfying formula F can be obtained as $DAP^{out}$=MAX($DAP_1^{in}$, $DAP_2^{in}$, $DAP_3^{in}$)=MAX(0, 0, 2)=2. It can be easily checked that this corresponds to the smallest confidentiality level that satisfies ($DAP^{out} \geq DAP_1^{in}$)$\wedge$ ($DAP^{out} \leq DAP_2^{in}$)$\wedge$($DAP^{out} \geq DAP_3^{in}$). Other examples, simple or complex relationships will be apparent from a review of the above. For instance, another example, of a simple relation is one where output DAP's are an upper bound for the input DAP's.

In some cases, there may be multiple transformation outputs from a transformation unit or processing block. When there are multiple transformation outputs (e.g., and thus multiple output DAP's), they may be determined such that all output DAP's are related with all input DAP's (more specifically that the formula F holds for all $DAP_j^{out}$). In many instances it is easiest and best to simply assign the same value satisfying formula F to all. If the goal is to minimize conservatism (as discussed above) then the "lowest" value satisfying the formula F should be used for all output DAP's. It will be understood that throughout this disclosure, the terms "generic data" and "data" are used interchangeably. The term "generic data" is introduced to emphasize that the "data" being discussed herein can be virtually any type of data (including the actual code or instructions being processed by a transformation unit or processing block). The same holds true for the case of DAP's versus "generic" DAP's, which may be further shortened to just "properties".

Not only may there be multiple transformation outputs, but additionally, in some embodiments there may be a complex relationship between input DAP's and output DAP's. In the general case, there can be systems with N sets of input DAP's and M sets of output DAP's. One possibility is that each output DAP is defined to be such that it is in relation with all input DAP's.

The relation is a k-ary relation (where k=N+1), described by ordered tuples $(x_1^{in}, x_2^{in}, \ldots, x_N^{in}, x_i^{out})$, where $1 \leq i \leq M$, and $x_1^{in} \in S_1^{in}, \ldots, x_N^{in} \in S_N^{in}$, and $x_1^{out} \in S_1^{out}, \ldots, x_M^{out} \in S_M^{out}$. In general, the elements $x_j^{in}$, where $1 \leq j \leq N$ may include all DAP's of all inputs and the DAP's may all be of distinct types (elements of distinct sets).

As some examples, for a first example assume the input sets are: confidentiality properties input set: $S_C^{in}=\{iCL, iCM, iCH\}$, the integrity properties input set: $S_I^{in}=\{iIL, iIM, iIH\}$ and the risk properties input set: $S_R^{in}=\{iRL, iRM, iRH\}$. Here the output sets may be: confidentiality properties output set: $S_C^{out}=\{oCL, oCM, oCH\}$, integrity properties output set: $S_I^{out}=\{oIL, oIM, oIH\}$ and the risk properties output set: $S_R^{out}=\{oRL, oRM, oRH\}$.

As another example, the following is an example of a 4-ary relation R for risk (which, in the example discussed here may be different than before), assuming only one input and one output: where $(c^{in}, i^{in}, r^{in}, r^{out}) \in R$, R is relation on $S_C^{in} \times S_I^{in} \times S_R^{in} \times S_R^{out}$ and the $r^{out}$ is selected such that it is in relation with all 3 input properties. The risk can also be expressed with binary relation B if a new set of ordered tuples are defined: $T=S_C^{in} \times S_I^{in} \times S_R^{in}$, and appropriate relation B from set T to the set $S_R^{out}$ where $(t, r) \in B$ and $t \in T$, $r \in S_R^{out}$ The same may be the case equivalently for all other outputs (e.g., 2 additional relations are obtained).

Considering multiple inputs (e.g., for the above example), there may be multiple choices. Embodiments may require that the output is in 4-ary relation with each of the 2 inputs, specifically: $(c_1^{in}, i_1^{in}, r_1^{in}, r^{out}) \in R$ and $(c_2^{in}, i_2^{in}, r_2^{in}, r^{out}) \in R$. Embodiments may also require that the output is in the 7-ary relation U, specifically: $(c_1^{in}, i_1^{in}, r_1^{in}, c_2^{in}, i_2^{in}, r_2^{in}, r^{out}) \in U$, or some other combination thereof.

Another possibility is that each output DAP is determined such that it is in relation with all the input and other output DAP's. So, in certain cases it may be also possible to have a k-ary relation (where k=N+M), described by ordered tuples $(x_1^{in}, x_2^{in}, \ldots, x_N^{in}, x_1^{out}, x_2^{out}, \ldots, x_M^{out})$, where $x_1^{in} \in S_1^{in}, \ldots, x_N^{in} \in S_N^{in}$, and $x_1^{out} \in S_1^{out}, \ldots, x_M^{out} \in S_M^{out}$.

Figure 2:
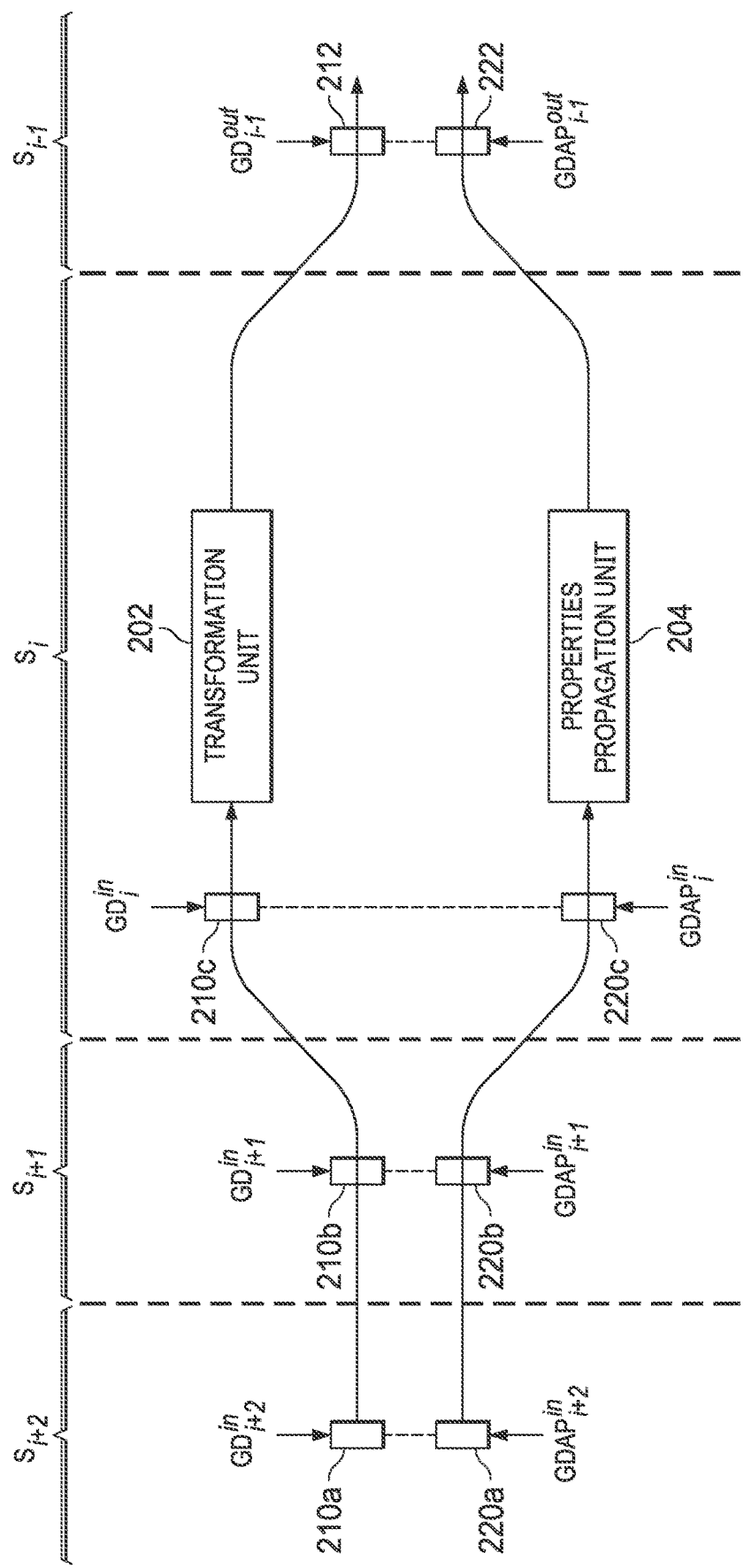
FIG. 2 is a block diagram for an embodiment of a computing system for securing data through the generation of data associated properties.

Moving then to FIG. 2, a block diagram for an embodiment of a system for securing data (or enforcing other properties) through the generation of DAP's is depicted. Here, the system comprises a computing system including a transformation unit 202 and a corresponding properties propagation unit 204. Transformation unit 202 can perform any (arbitrary) transformation T on the input generic data (GD) 210 to produce the transformed generic data at the output. The transformation unit 202 may thus be a collection of processing logic such as a Central Processing Unit (CPU) or Arithmetic Logic Unit (ALU) or almost any other type of processing device.

Thus, embodiments of a computing system include properties propagation unit 204 distinct from the transformation unit 202. The transformation unit 202 includes first logic for processing input data (e.g., data, including an instruction for the transformation unit 202) by applying a transform to the input data to generate an output datum corresponding to an input datum of the input data received at the transformation unit 202. Each and every input datum received at the transformation unit may have a corresponding input DAP distinct from that input datum and specific to that input datum. The DAP can, for example, comprise a data confidentiality level or a data integrity level.

The properties propagation unit 204 may include second logic for receiving the input DAP corresponding to the input datum received at the transformation unit 202 and generate an output DAP corresponding to, and synchronized with, the output datum generated by the transformation unit by applying a relation to the input DAP. This relation may (or not) be, for example, based on the transform applied by the transformation unit 202.

More specifically, the transformation unit 202 may (or not) have an internal state, and the resulting generic data may (or not) depend on internal state of the transformation unit 202. Generic data 210 (e.g., $GD_i^{in}$, $GD_{i+1}^{in}$ and $GD_{i+2}^{in}$) is used as input to the transformation unit 202. Any aspect of this input data 210 may change between each application of the transformation T applied by the transformation unit 202. Note that $GD_i^{in}$ is not required to be independent or different from $GD_{i-1}$. $GD_i^{in}$ may even comprise $GD_{i-1}$. This implies there may be a feedback loop in the data dependencies, which is not uncommon in many algorithms.

It may be understood that the mechanism that controls the flow of operands to and from the transformation unit 202 (and thus defines or constructs its dependencies cone) is essentially how a generic data processing device or system operates (be it CPU, GPU, DSP, database, document system, etc.). The design and description of such a mechanism will be understood as being specific to a given implementation of a data processing device or system. However, it is assumed such a mechanism exists (otherwise the data processing device or system cannot operate) and thus, it is clear that it would be straightforward for the designer of a data processing device of the system to be able to tap into it (or to replicate it) in order to meet the requirements related to the dependency cone of the properties propagation unit.

Generic data 212 (e.g., $GD_{i-1}^{out}$) is thus output from the transformation unit 202. The generic data output 212 by the transformation unit 202 depends on the corresponding generic data input 210 to the transformation unit 202 to which the transformation T was applied, as well as the transformation T itself.

It will be noted here that the generic data is marked as $GD_i^{in}$, $GD_i^{out}$, etc., where the superscript "in" or "out" is just notational help indicating if a transformation (e.g., T) was already applied to it or not, and the subscript is an index to distinguish between "chunks" of generic data that are the inputs to or outputs of one application of the transformation. The form of the generic data can be arbitrary, including content, size, multiplicity, type and formatting and any of these may (or may not) vary with the index.

Steps ($S_{i+2}$, $S_{i+1}$, $S_i$, $S_{i-1}$) each indicate a step in which the transformation T is applied once to one or more of generic input data 210 by the transformation unit 202 to obtain the generic output data 212. In other words, in step $S_i$, the transformation is applied to $GD_i^{in}$ to produce the output $GD_i^{out}$. The depiction of FIG. 2, includes generic data belonging to four steps, the $i-1^{th}$ the $i^{th}$, $i+1$th and $i+2^{th}$ step.

The transform T is still to be applied to $GD_i^{in}$, $GD_{i+1}^{in}$ and $GD_{i+2}^{in}$, while the $GD_{i-1}^{out}$ is the result of transform's application to $GD_{i-1}^{in}$. The application of transform T on the generic input data that results in generic output data in step i may be written as $$GD_i^{in} \xrightarrow{transform\ T} GD_i^{out},$$

or equivalently $GD_i^{out} = T(GD_i^{in})$. The number of steps and thus number of applications of the transform T is not limited. Moreover, the generic data inputs $GD_i^{in}$ may influence the transformation in an arbitrary way. For example, in case of a CPU, the generic data $GD_i^{in}$ may comprise either 'data' and/or 'code'. CPU instructions with immediate values (for example addi r5, r7, 0x11, where 0x11 is immediate) are simple examples of how data and code can be intertwined.

Generic DAP's 220 (e.g., $GDAP_i^{in}$, $GDAP_{i+1}^{in}$ and $GDAP_{i+2}^{in}$) associated with the generic data 210 provided to the transformation unit 202 are provided as input to the properties propagation unit 204. Each $GDAP_i^{in}$ 220 may comprise multiple different properties, for example confidentiality, integrity, risk, freshness, etc. These properties track the properties of the corresponding generic data $GD_i^{in}$ 210 to which they are associated. For example, $GD_i^{in}$ 210 generic data 210c may comprise two 32-bit values (V1 and V2), and each of these may have distinct confidentiality (c) and integrity (i) properties associated with the values. In such a case the $GDAP_i^{in}$ 220c may comprise $\{c_{V1}, i_{V1}, c_{V2}, i_{V2}\}$.

These generic DAP's 220 are associated with input generic data 210, such that the i-th $GDAP_i^{in}$ is associated with the i-th $GD_i^{in}$ and so forth (e.g., generic DAP 220a is associated with generic input data 210a, generic DAP 220b is associated with generic input data 210b, etc.).

Based on the input generic DAP's 220 ($GDAP_i^{in}$, $GDAP_{i+1}^{in}$ and $GDAP_{i+2}^{in}$), the properties propagation unit 204 will determine output generic DAP's 222 (e.g., $GDAP_{i-1}^{out}$) associated with output generic data 212 (e.g., $GD_{i-1}^{out}$). The properties propagation unit 204 determines these generic output DAP's 222 based on the input generic DAP's 220 (e.g., $GDAP_i^{in}$, $GDAP_{i+1}^{in}$ and $GDAP_{i+2}^{in}$) corresponding to the generic data 210 (e.g., $GD_i^{in}$, $GD_{i+1}^{in}$ and $GD_{i+2}^{in}$) provided to the transformation unit 202 (e.g., on which the transformation T was applied by the transformation unit 202 to generate output generic data 212 (e.g., $GD_{i-1}^{out}$)).

The properties propagation unit 204 determines the generic output DAP's 222 in such a way that the generic output DAP's 222 are in relation R with generic input data associated properties (e.g., $GDAP_i^{in}$, $GDAP_{i+1}^{in}$ and $GDAP_{i+2}^{in}$). The relation R may comprise multiple relations. For example: if a GDAP is comprised of the confidentiality property and an integrity property, then the relation R may have a property that it is comprised of relation Rc defined between the confidentiality properties and relation Ri defined between the integrity properties. The relation R in such a case is separable into two relations, Rc and Ri.

Figure 3:
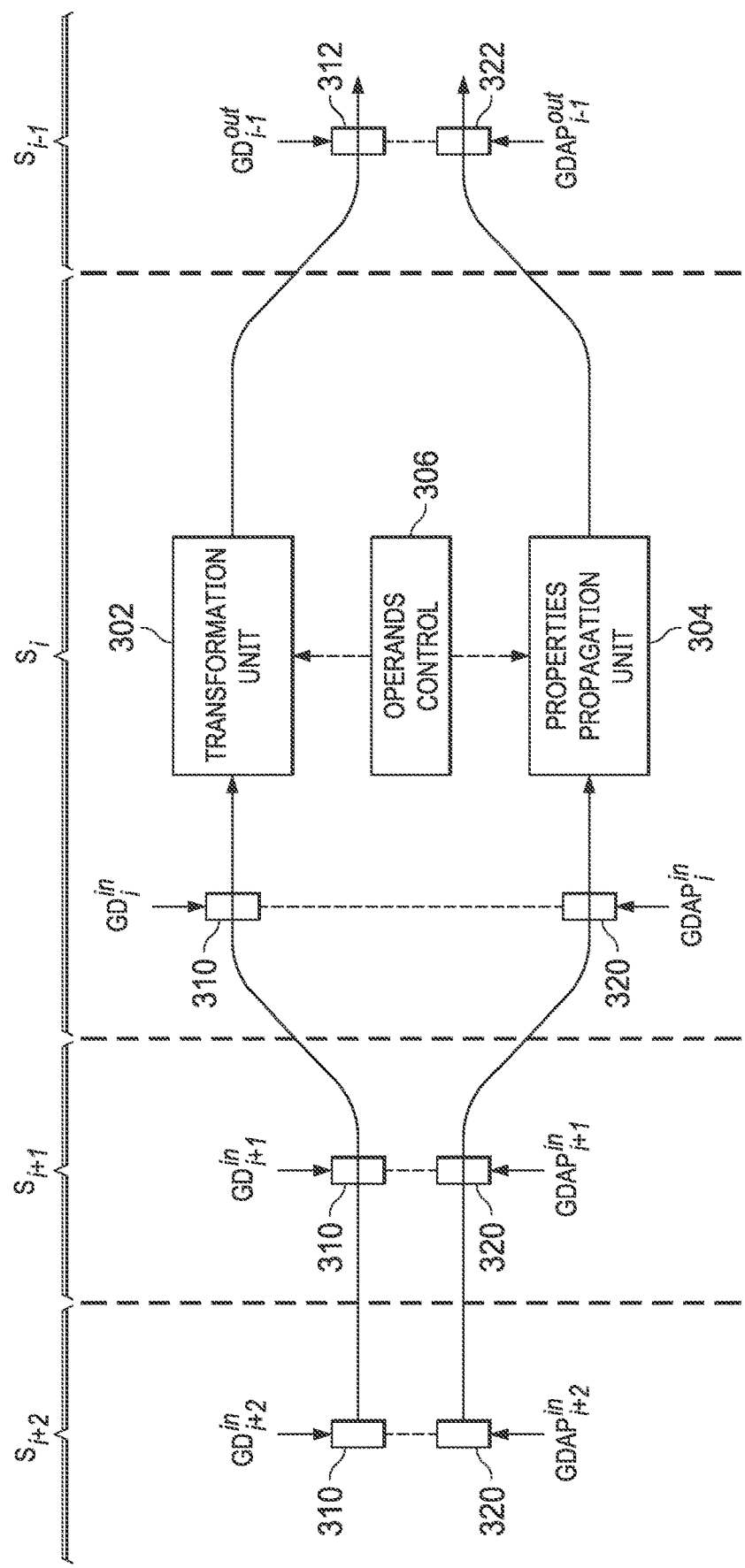
FIG. 3 is a block diagram depicting an embodiment of a computing system for securing data.

It will be noted then, that in some embodiments, the properties propagation unit will operate in synchronicity with the transformation unit. FIG. 3 depicts an embodiment of a system of securing data that highlights that in certain embodiments, the dependency cones of operands entering the transformation unit 302 and properties propagation unit 304 will match. To coordinate these dependency cones, embodiments may utilize operands control logic 306 that controls the operand flow of transformation unit 302 (e.g., which is part of the data processing device or system) and leverage it to also control the flow of operands into properties propagation unit 304. Thus, operands control logic 306 utilized to control the flow of generic data $GD_i^{in}$ into transformation unit 302 may also control the flow of generic data associated properties $GDAP_i^{in}$ into properties propagation unit 304 such that the input of generic data $GD_i^{in}$ into transformation unit 302 is synchronized with the input of the corresponding generic data associated properties $GDAP_i^{in}$ into properties propagation unit 304.

To describe this synchronization in another way, for each determination of the output GD 312 through application of transformation T on the input GD 310 by transformation unit 302, there is a corresponding determination of the output GDAP 322 such that the output GDAP 322 is in relation R with the corresponding input GDAP 320 that is associated with such input GD 310.

In the case with multiple input 310 and multiple output GD's 312, for each transformation by transformation unit 302 of GD inputs 310 resulting in one or more GD outputs 312, there is a corresponding determination of GDAP outputs 322 such that each output GDAP 322 is in relation R with all input GDAP's 320 that are associated with such input GD's 310.

Specifically, in certain embodiments, a set of input data may be received at the transformation unit and a set of output data may be generated by the transformation unit by applying the transform to generate the set of output data based on the set of input data.

Each of the set of input datums may have corresponding input DAP's distinct from that input datum and specific to that input datum, where each of the corresponding input DAP's for the set of input datums is provided to the properties propagation unit. The properties propagation unit can generate a set of output DAP's comprising each output DAP corresponding to each of the set of output datums generated by the transformation unit.

Figure 4:
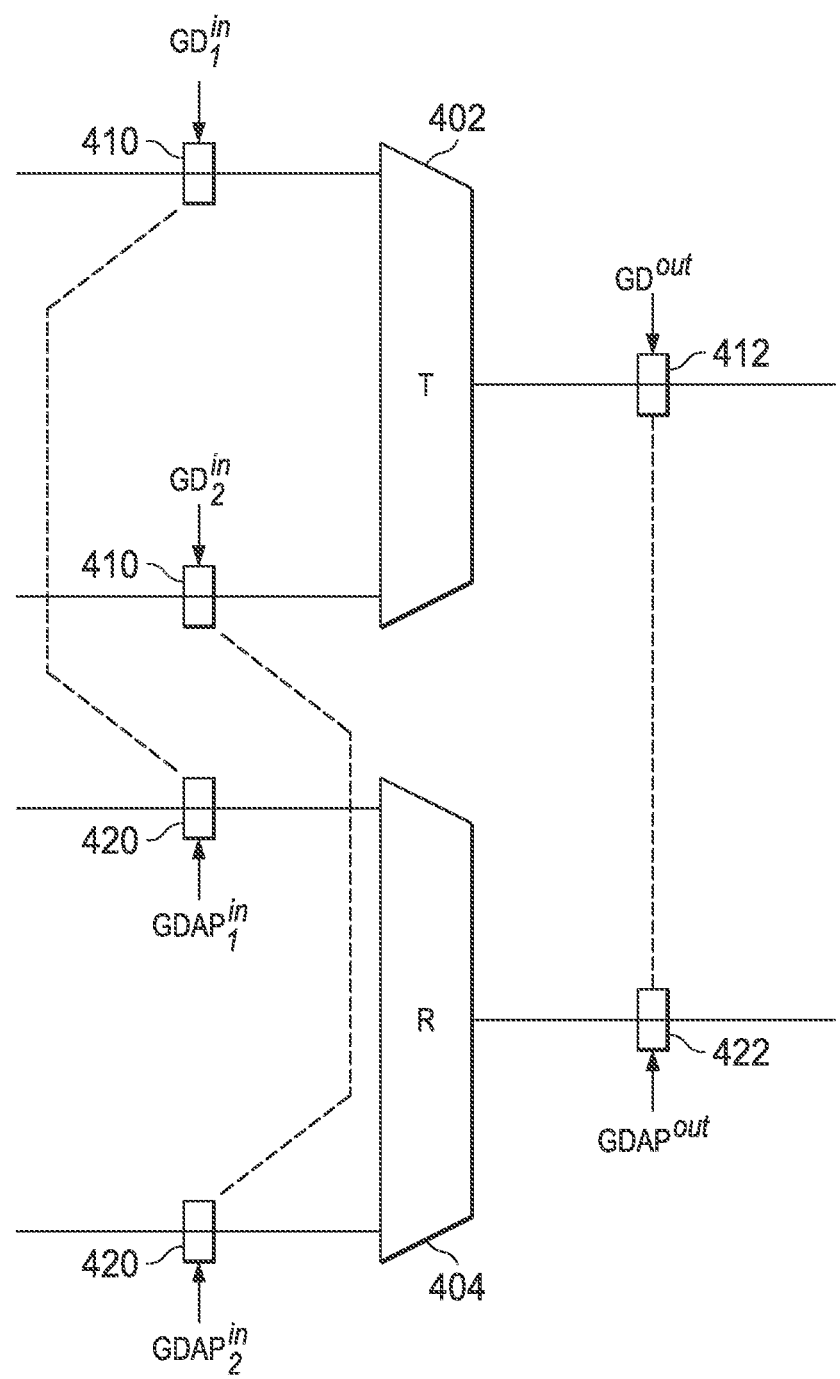
FIGS. 4 and 5 are block diagrams depicting synchronization of multiple inputs and multiple outputs.
Figure 5:
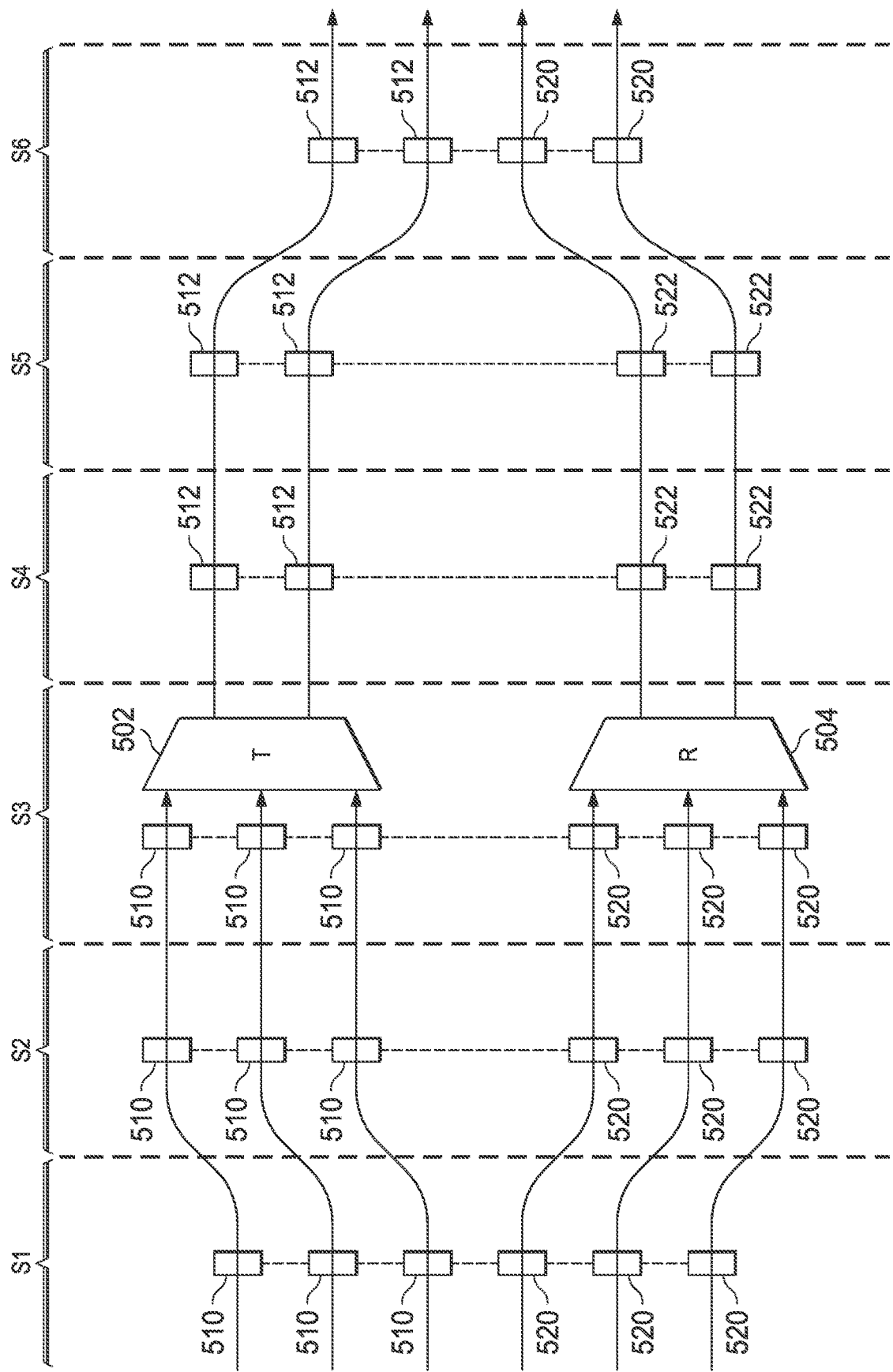

This synchronization of multiple inputs and multiple outputs according to embodiments is illustrated in FIGS. 4 and 5. FIG. 4 is a block diagram depicting an example of a two input GD's 410 into a transformation unit 402 and their association with corresponding input GDAPs 420 into properties propagation unit 404 such that the output GDAP 422 is associated with output GD 412 and is in relation R with the corresponding input GDAPs 420 that are associated with such input GD's 410 that resulted in output GD 412. FIG. 5 is a block diagram illustrating an example of an embodiment with multiple GD inputs 510 transformed into multiple GD outputs 512 by transformation unit 502. In each step (S1, S2, etc.), each of the output GDAP's 522 is determined by properties propagation unit 504 such that it is in relation with all of the input GDAP's 520 of said step (S).

As embodiments of the systems for securing data disclosed may utilize a properties propagation unit generating DAP's associated with generic output data generated by a transformation unit, embodiments of the system can be understood in terms of two independently-operating domains: a data domain and a properties domain. The data domain (sometimes referred to as a mission domain) is where the generic data GD is processed as it would be in any data processing system by passing through (at least) one transformation applied by a transformation unit. The way generic data is processed determines the data flow dependency graph. The additional properties domain is where the generic data associated properties GDAP associated with the generic data GD are processed according to the same data flow dependency graph as the data domain—with the difference that the transformation(s) T of the transformation unit are replaced with relation(s) R of the properties propagation unit.

Note then that the synchronization between data processing by the transformation unit and properties processing by the properties propagation unit may not be necessarily evaluated in real time, simultaneously, or even interleaved, but rather on the level of the data flow dependency graph, which is determined by the data domain processing path of the transformation unit. This data processing dependency cone is then used by the properties domain processing of the properties propagation unit.

Embodiments may thus achieve synchronization of the transformation unit and the properties propagation unit in a number of different manners. In one embodiment, a bus carrying GD (e.g., to the transformation unit) is extended to additionally carry the GDAP (e.g., to the properties propagation unit). Just before entering the transformation unit, such a bus may be split into two separate buses; one carrying GD and going into the transformation unit and the other going to the properties propagation unit. The bus exiting the transformation unit and carrying the output GD is then combined with the bus exiting the properties propagation unit carrying the GDAP. If required, the properties propagation unit output or transformation unit output is delayed so that GD and GDAP outputs are in sync.

In some embodiments, the data flow dependency graph is logged during data processing. The operation of the properties propagation unit on GDAP is then performed out of order with data processing. In the case where the data flow dependency graph is known ahead of time (e.g., because it is static), the data flow dependency graph can be used to determine GDAP even before the data processing is performed—as long as input GDAP's are also known ahead of time. An example of such a case is when GDAP's of data are determined according to a device from which the data originates.

The transformation unit and properties propagation unit may be realized as two (or more) processors working in synchronization (e.g., in lockstep mode), where the processor T of the transformation unit handles the data processing and a second (e.g., possibly simplified) processor P of the properties propagation unit implements the logic for determining the resulting data associated properties. The data dependency flow graph of the processor T that is not deducible by processor P may be transmitted in the form of trace data from processor T to processor P. One possible realization of this communication is to use the trace data from the processor T's trace port, such as a trace port intended for debugger support or the like.

Accordingly, the GD and GDAP that are associated with each other may be always transferred as one single transaction (e.g., a single transaction, in the sense of an atomic transaction on an interconnect bus or an atomic database transaction, where either all elements of the transaction are performed or none are). The GD transformation and GDAP determination is then computed as an atomic operation. The results may then also be transmitted as one transaction.

Figure 6B:
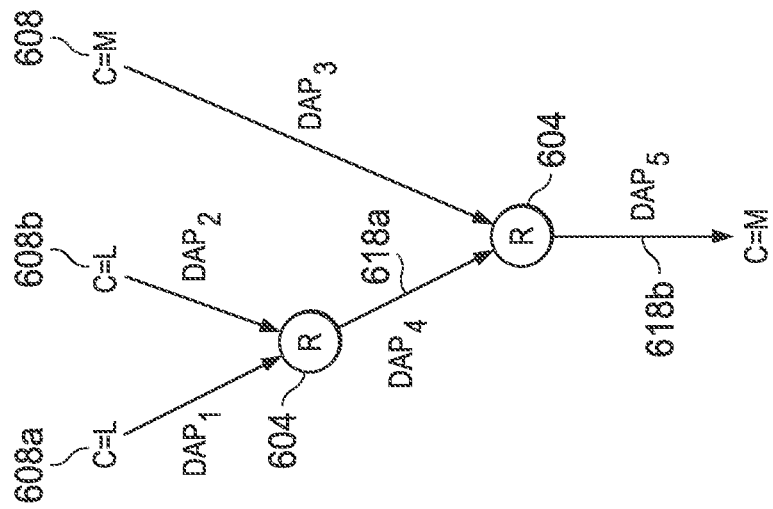
FIGS. 6A and 6B are block diagrams depicting examples of data flow graphs.
Figure 6A:
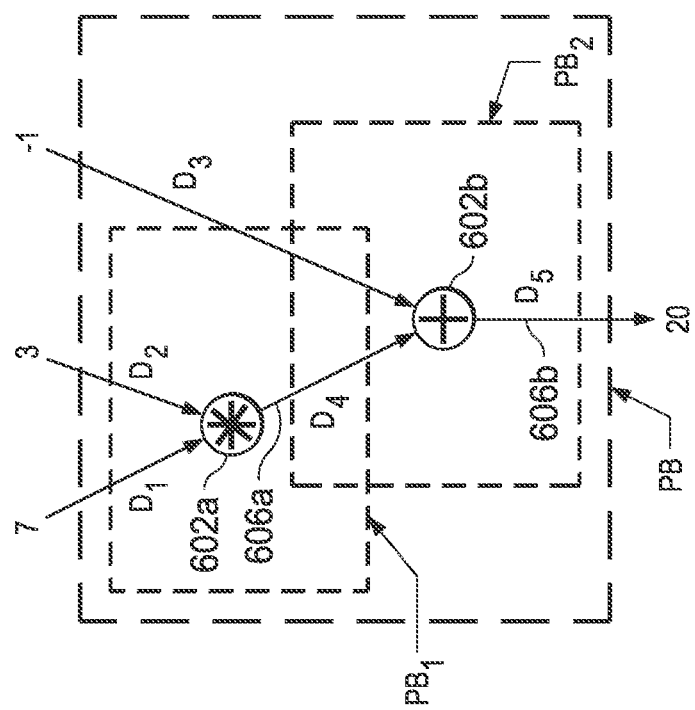

It may now be useful to illustrate a few examples. FIGS. 6A and 6B are a block diagram illustrating an example of the operation of embodiments in the data domain and the properties domain. Specifically, in FIG. 6A an example of a data flow graph with processing blocks marked as PB, $PB_1$ and $PB_2$. In FIG. 6B is the same data flow dependency graph for the properties propagation, with the "*" and "+" transformations $602a$, $602b$ of FIG. 6A each replaced by an instance of relation R $604$. The DAP in the example shown is "c", the confidentiality, where L means "low" confidentiality and M means "high" confidentiality. Thus, FIG. 6A is an example of the data flow graph (e.g., data processing steps achieved through the application of transformations "*" $602a$ and "+" $602b$ on the inputs $D_1$, $D_2$, $D_3$ and $D_4$) while an illustration of the corresponding DAP's determination is shown in FIG. 6B.

As can be seen, the "+" transformation $602b$ cannot be performed before all its inputs are resolved. The example data processing is thus performed in two steps; and accordingly, the determination of the data associated properties must also be performed in two steps as is illustrated in FIG. 6B.

Specifically, in this example, DAP's $608$ (and $618$) are from the set S={L, M, C}. The relation R $604$ is reflexive, antisymmetric and transitive with the following pairs of elements of S being in relation R: M R L, C R M, C R L (and as follows from reflexivity, L R L and M R M and C R C). This example illustrates that generic data may be comprised of multiple parts (which is also generic data). Below the $GD_{S1}^{in}$ is input generic data of the Step S1 (e.g., $PB_1$). The $D_1$ and $D_2$ are also generic data. As can be seen, this is similarly the case for GDAP's $608$.

In step S1, the input generic data $GD_{S1}^{in}$ comprises $D_1$ and $D_2$: $GD_{S1}^{in}=\{D_1, D_2\}=\{7, 3\}$. The input generic data associated properties $GDAP_{S1}^{in}$ comprises $DAP_1$ $608a$ and $DAP_2$ $608b$ $GDAP_{S1}^{in}=\{DAP_1, DAP_2\}=\{L, L\}$. The output generic data $GD_{S1}^{out}$ $606a$ is obtained by applying the transformation "*" $602a$ to input generic data:

$$GD_{S1}^{in} \xrightarrow{transform\;*} GD_{S1}^{out}.$$

Here, the $GD_{S1}^{out}$ $606a$ comprises $D_4$.

The output generic DAP's $GDAP_{S1}^{out}$ $618a$ are determined such that $GDAP_{S1}^{out}$ $618a$ are in relation R with $GDAP_{S1}^{in}$:

$$GDAP_{S1}^{out} \xrightarrow{is\;in\;relation\;R\;with} GDAP_{S1}^{in},$$

specifically that $(DAP_4\;R\;DAP_1) \wedge (DAP_4\;R\;DAP_2)$. $DAP_4=L$ is the least conservative possibility. The $GDAP_{S1}^{out}$ comprises $DAP_4$: $GDAP_{S1}^{out}=\{DAP_4\}=\{L\}$.

In step 2 (S2), the input generic data $GD_{S2}^{in}$ comprises $D_4$ and $D_3$: $GD_2^{in}=\{D_4, D_3\}=\{21, -1\}$. The input generic data associated properties $GDAP_{S2}^{in}$ comprises $DAP_4$ and $DAP_3$: $GDAP_{S2}^{in}=\{DAP_4, DAP_3\}=\{L, M\}$. The output generic data is obtained by applying the transformation "+" to input generic data:

$$GD_{S2}^{in} \xrightarrow{transform\;+} GD_{S2}^{out}.$$

The $GD_{S2}^{out}$ $606b$ comprises $D_5$.

The output generic data associated properties $GDAP_{S2}^{out}$ $618b$ are determined such that $GDAP_{S2}^{out}$ $618b$ is in relation R with $GDAP_{S2}^{in}$:

$$GDAP_{S2}^{out} \xrightarrow{is\;in\;relation\;R\;with} GDAP_{S2}^{in},$$

specifically that $(DAP_5 \ R \ DAP_4) \wedge (DAP_5 \ R \ DAP_3)$. $DAP_5=M$ may be the least conservative possibility. The $GDAP_{S2}^{out}$ comprises $DAP_5$: $GDAP_{S2}^{out}=\{DAP_5\}=\{M\}$.

It will be noted that embodiments of the system may work as intended also if the internal details (implementation) of processing block PB are either not known or are ignored. In such a case, only the generic data input (e.g., comprising $D_1$, $D_2$, $D_3$) and output generic data ($D_5$) of the transform implementing complete PB block functionality are important (and the internal details of the transform and its composition of "*" and "+" are not relevant). In such a case, the $DAP_5$ is determined such to be in relation R with all of $DAP_1$, $DAP_2$ and $DAP_3$.

Figure 7B:
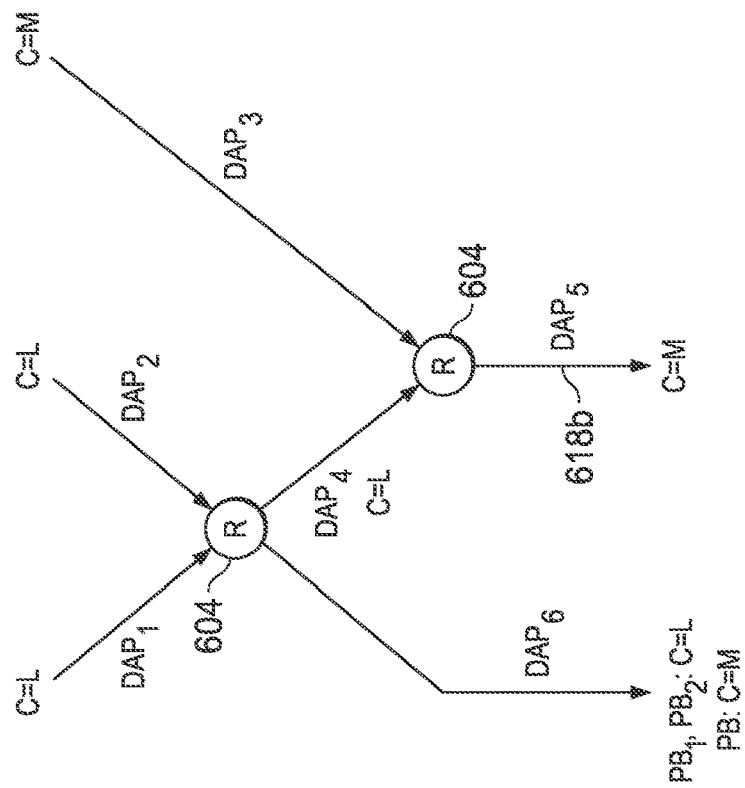
FIGS. 7A and 7B are block diagrams depicting examples of data flow graphs.
Figure 7A:
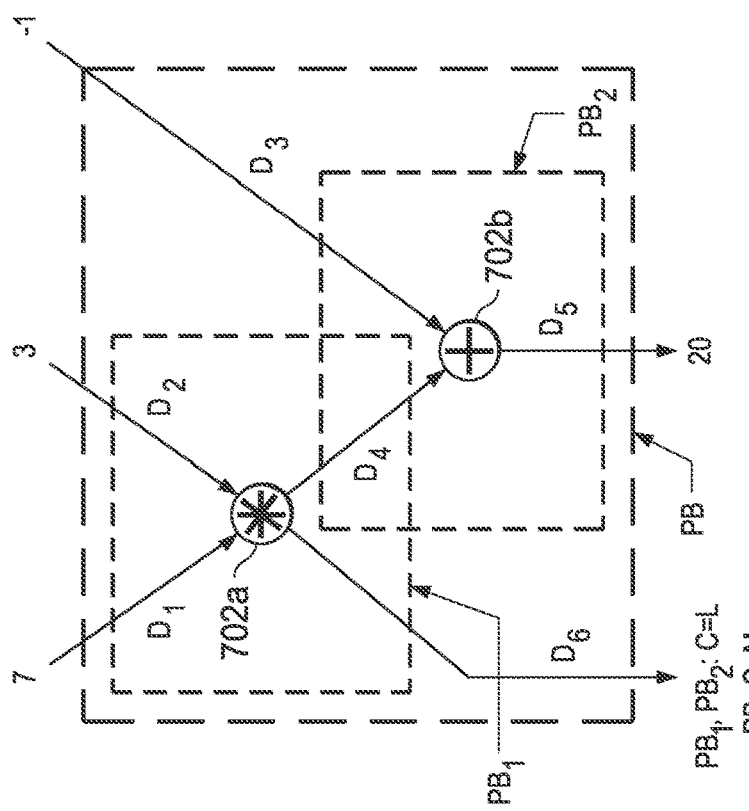

Another example of the operation of embodiments in the data domain and the properties domain is illustrated in FIGS. 7A and 7B, which illustrates an example similar to FIGS. 6A and 6B with an additional $D_6$ generic data output and corresponding generic DAP output $DAP_6$. In FIG. 7A, here the data flow graph for the transformation unit may contain the transformation "*" 702a with an additional output $D_6$ (for the purpose of this example, it does not matter if $D_6$ is the upper part of the multiplication result, or if $D_6$ is a duplication of $D_5$).

In the illustrated example, the internal details of processing block PB (being comprised of two processing blocks $PB_1$ and $PB_2$ such that the transformations "*" 702a and "+" 702b) are connected in the specific manner shown. FIG. 7B depicts a breakdown of the dependency graph of FIG. 7A. The additional $DAP_6$ in FIG. 7B is determined so that it is in relation with both $DAP_1$ and $DAP_2$, and thus can be assigned c=L.

These examples and the partitioning of PB into $PB_1$ and $PB_2$ can be understood in the context of processor microcode. The DAP's may be propagated on the level of instructions (in the example, the multiply-and-accumulate (or MAC) instruction represented by block PB) or on the level of microcode (separated multiply "*" and addition "+" microcode instructions represented by $PB_1$ and $PB_2$).

It is important to note that GDAP's may comprise different properties that are updated (e.g., computed or otherwise generated or obtained) at different hierarchical levels of the processing block. In the illustrated example, the confidentiality property may be determined and updated on a microcode level ($PB_1$, $PB_2$), while some other property like integrity or instruction count may be determined on the consolidated MAC instruction hierarchical level (PB).

Figure 8B:
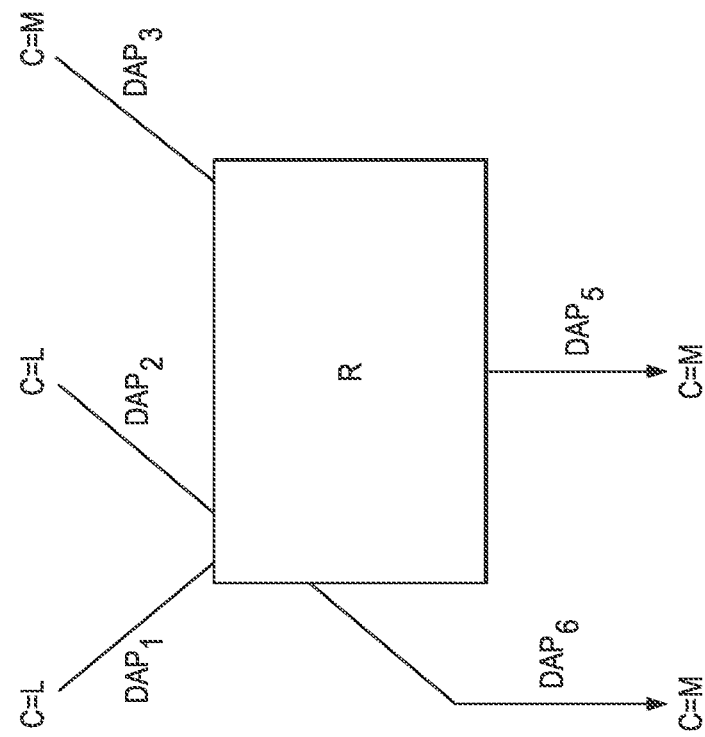
FIGS. 8A and 8B are block diagrams depicting examples of data flow graphs.
Figure 8A:
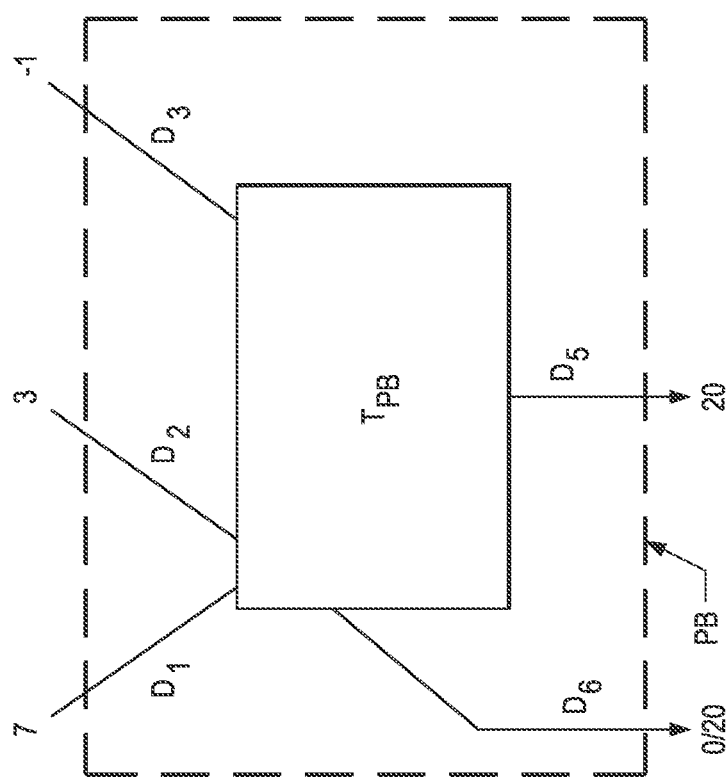

Now referring to FIGS. 8A and 8B, if the details of the PB implementation are not known or simply not relevant, then these details either cannot or need not be taken into account. Thus, in this example, both $DAP_5$ and $DAP_6$ are determined such that they are in the relation R with all $DAP_1$, $DAP_2$, $DAP_3$, resulting in $DAP_5$ and $DAP_6$ both being assigned c=M in the illustrated example.

The illustrated example of FIGS. 8A and 8B show how less detail (either because it is not known or simply not taken into account) may result in more conservative determination of DAP's. In both cases (with more detail as illustrated in FIGS. 7A and 7B and with less detail as illustrated in FIGS. 8A and 8B) the values of $DAP_6$ and $DAP_5$ illustrate that in the dependency cone of $D_5$ and $D_6$ there is no data with DAP c=H. However, if more details of PB are known and taken into account then, as illustrated in FIGS. 7A and 7B, as $D_6$ does not, in fact, depend on any data with DAP c=H or c=M, $DAP_6$ can thus be assigned $DAP_6$=L.

This assignment can be expressed more formally as $$D_1, D_2, D_3 \xrightarrow{transform \ T\_PB} D_5, D_6$$

and thus: $DAP_5$ such that $(DAP_5 \ R \ DAP_1) \wedge (DAP_5 \ R \ DAP_2) \wedge (DAP_5 \ R \ DAP_3)$, and $DAP_6$ such that $(DAP_6 \ R \ DAP_1) \wedge (DAP_6 \ R \ DAP_2) \wedge (DAP_6 \ R \ DAP_3)$.

As mentioned above, embodiments as disclosed herein may be equally effectively utilized when the generic data (GD) comprises code (e.g., instructions) that is actually being executed (or that is to be executed) by the transformation unit of the system.

Figure 9:
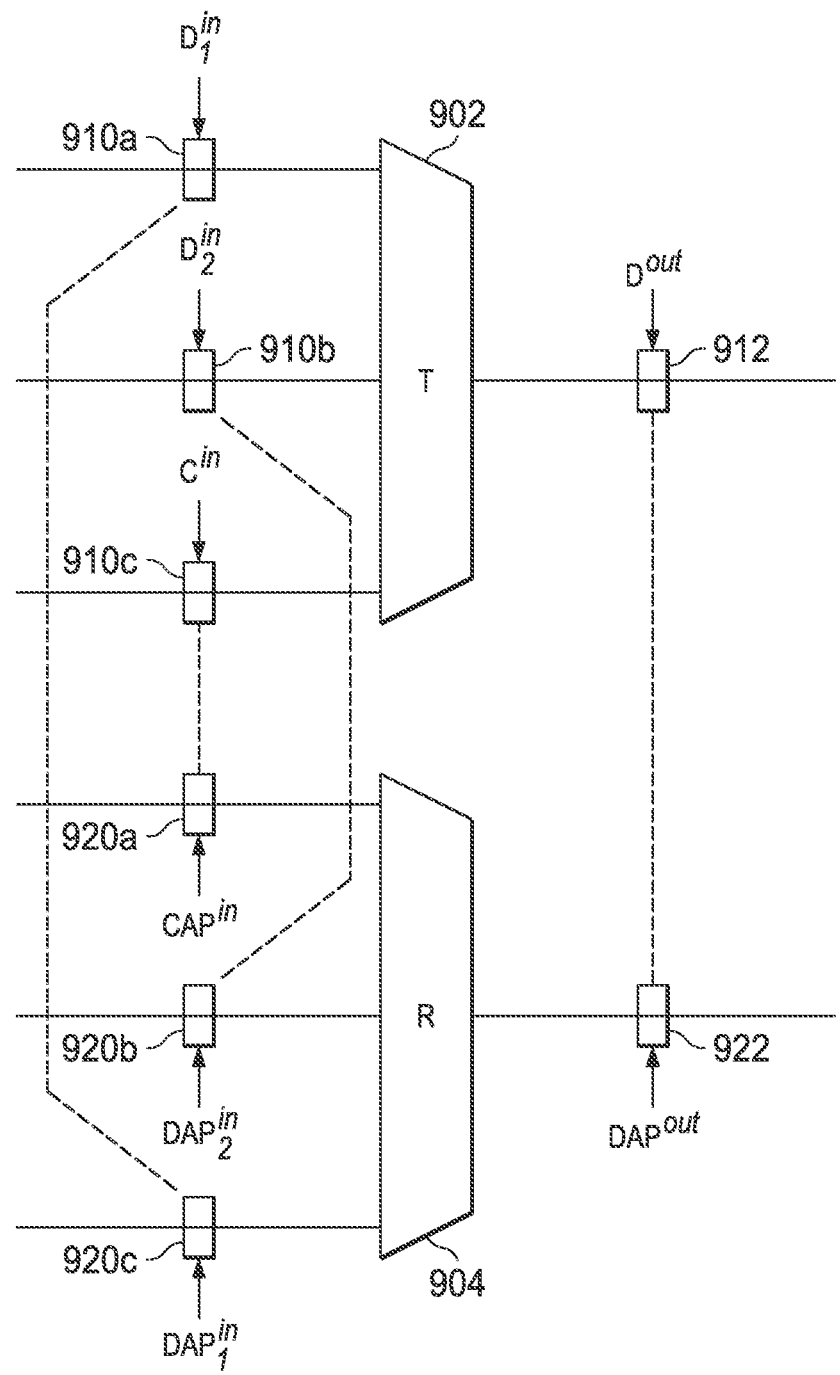
FIG. 9 is a block diagram depicting a computing system according to an embodiment.

FIG. 9 is a block diagram illustrating how some embodiments may handle the generation of data associated properties for generic data that comprises code. In particular, it may be understood that, ultimately, code is just a means to influence the operation of the transformation T of the transformation unit, and it can thus be handled as generic data (or part of it) upon which the output of transform T of the transformation unit depends. Here, only inputs and outputs of one step (e.g., such as a step associated with a processing block) of a transform application are shown with the dotted lines representing associations between the various generic data and the generic DAP's associated to it. Thus, transformation step 902 may receive generic inputs 910, including a (code) generic data input $C^{in}$ 910c and two generic data inputs, $D_1^{in}$ 910a and $D_2^{in}$ 910b. The properties propagation step 904 may thus receive corresponding input generic DAP's 920, including a code data associated property $CAP^{in}$ 920a corresponding to a code generic data input $C^{in}$ 910c, input generic data associated property $DAP_i^{in}$ 920c corresponding to generic data input $D_1^{in}$ 910a and input generic data associated property $DAP_2^{in}$ 920b corresponding to generic data input $D_2^{in}$ 910b. The properties propagation step 904 may thus generate output generic data properties $DAP^{out}$ 922 corresponding to generic output data 912.

Figure 10:
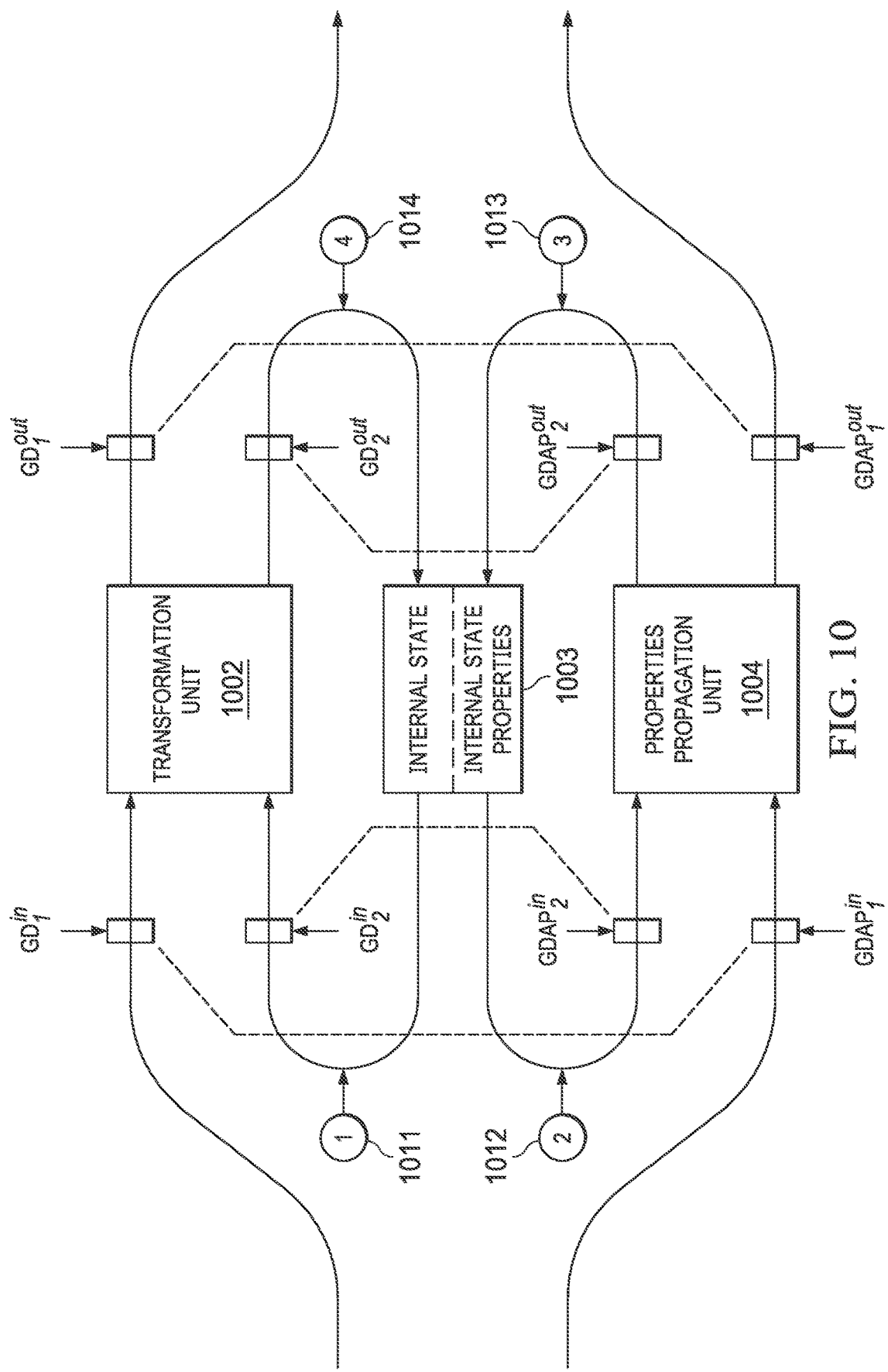
FIG. 10 is a block diagram depicting a computing system according to an embodiment.

FIG. 10 is block diagram illustrating how embodiments may process generic data where this generic data can originate from, and influence, an internal state of the transformation unit or the properties propagation unit of the system. In this embodiment, the system may include the transformation unit 1002, the properties propagation unit 1004 and internal state logic 1003. Internal state logic 1003 may include logic or a computer readable storage medium for storing or passing though generic data, including an internal state.

Internal state logic 1003 may include, for example, a portion for use with transformation unit 1002 or a portion for use by the properties propagation unit 1004. An internal state can be, for example, held in internal state logic 1003 comprising memory (for example flip flops, SRAM, etc.) together with an associated GDAP (e.g., in additional memory of internal state logic 1003), or passed through (for example by simple wires, bus transactions, etc. of internal state logic 1003) together with an associated GDAP (e.g., through additional wires, as part of same bus transaction with GD, etc.).

In certain embodiments then, internal state logic 1003 may store at least one of the set of output datums generated by the transformation unit 1002 and at least one of the corresponding output DAP's generated by the properties propagation unit 1004, and provide at least one subsequent input datum to the transformation unit 1002 and at least one subsequent input DAP corresponding to the at least one subsequent input datum provided to the properties propagation unit 1004.

Examples of such internal states may include a register or register file in a CPU implemented from flip flops. The GD may be the content of each register with additional associated data properties GDAP (e.g., also stored in flip flops), such that every read/write of a register results in a read/write of the associated GDAP. Other examples of such internal states may include a carry bit, indication or flag for supervisor mode, global variables, memory content or other states of transformation unit 1002 or properties propagation unit 1004.

Thus, for example, with respect to transformation unit 1002, generic data that may be input to transformation unit 1002 (e.g., $GD_2^{in}$) may be provided from internal state logic 1003 associated with the transformation unit 1002 while output generic data from the transformation unit 1002 (e.g., $GD_2^{out}$) may be stored (or pass through) internal state logic 1003 associated with the transformation unit 1002, such that it can be provided back to the transformation unit 1002 at a subsequent time as input generic data (or used to influence or determine the subsequent generic data input to transformation unit 1002).

Similarly, with respect to properties propagation unit 1004, generic DAP's that may be input to properties propagation unit 1004 (e.g., $GDAP_2^{in}$) may be provided from internal state logic 1003 associated with the properties propagation unit 1004 while output generic data from the properties propagation unit 1004 (e.g., $GDAP_2^{out}$) may be stored (or pass through) internal state logic 1003 associated with the properties propagation unit 1004, such that it can be provided back to the properties propagation unit 1004 at a subsequent time as input generic DAP (or used to influence or determine the subsequent generic DAP input to properties propagation unit 1004).

It will be noted here that by providing an internal state from internal state logic 1003 as generic data input to transformation unit 1002 (e.g., $GD_i^{in}$) (path 1011), storing generic data output from transformation unit 1002 (e.g., $GD_i^{out}$) in internal state logic 1003 (path 1014), providing an internal state from internal state logic 1003 as generic DAP's input to properties propagation unit 1004 (e.g., $GDAP_i^{in}$) (path 1012) and storing generic DAP outputs from the properties propagation unit 1004 (e.g., $GDAP_i^{out}$) in internal state logic 1003 (path 1013) are independent pathways. Thus, various embodiments may or may not contain any of these explicit GDAP-dedicated pathways.

Now turning to FIG. 11, we show one embodiment of a system for securing data having internal state logic comprising one or more internal state registers. Here, the system may include a transformation unit 1102, a properties propagation unit 1104 and internal state memory 1103 comprising generic data memory 1103a (for example, in the form of a register file) for generic data to be used with transformation unit 1102, and additional memory 1103b (e.g., a register file) for generic DAP's for use with properties propagation unit 1104. In some embodiments, where transformation unit 1102 is a CPU or the like, the memory can also be directly bypassed.

As an example, consider a simple instruction "addition with immediate value" for use with a transformation unit 1102: addi r, I (r<-r+I), where: r is a register and I is an integer to be added to the value of the register. Such an example may be mapped to the system of FIG. 11 as follows: $GD_i^{in}$ may comprise the instruction "addi r, I" encoding an integer value of "I", $GD_2^{in}$ would represent the value held in the register (e.g., r). $GDAP_1^{in}$ may comprise the GDAP associated with the instruction code (the "addi r, I") and the GDAP is also associated with value of integer "I". $GDAP_2^{in}$ comprises the GDAP that is associated with the register (e.g., "r"). Here, the $GD^{out}$ value is determined by adding I to the value of r, and the $GDAP^{out}$ value is determined such that it is in relation with all $GDAP_1^{in}$ and $GDAP_2^{in}$.

The example above would be similar in nature to the case of another instruction: "multiplication with immediate value". Note that the content of $GD_1^{in}$ controls the operation of the transformation applied by the transformation unit 1102. Consider yet another example instruction: "negate r". In such a case, $GD_1^{in}$ may comprise only the instruction encoding itself (i.e., in this case, it is unnecessary to embed an immediate operand value "I" in the instruction).

As yet another example, consider the instruction "setreg I", which may set the value of a register to the value I in transformation unit 1102. Note that $GD_2^{in}$ (and thus $GDAP_2^{in}$) are redundant in the case of such an instruction (which, for example, can be handled by not having an input, or ignoring its values, etc.).

As has been discussed then, DAP's may be provided to a properties propagation unit which determines an output data associated property associated with a corresponding data output generated by the transformation unit. Such a properties propagation unit may provide such output DAP's for corresponding output data from the transformation unit substantially regardless of the actual processing or transformation applied by the transformation unit. Thus, systems and methods as disclosed may be usefully utilized on almost any arbitrary complex processing or transformation unit to provide output DAP's associated with data output by the transformation unit.

These data properties may include properties such as confidentiality, integrity, quality, availability, freshness, risk. Thus, by having output DAP's associated with data output by the transformation unit (e.g., based on the corresponding input data associated properties associated with input data from which the output data was generated), a number of security, safety and other measures may be implemented. Such measures may include the application of input security policies or output security policies using perimeter guard logic.

These perimeter guards may include input perimeter guards and output perimeter guards. Input perimeter guards may receive input data and a policy. Based on the policy and the input data, an input perimeter guard may produce output data and corresponding data associated property. In this manner, input perimeter guards may be utilized, for example, as enforcers or gates for data input to a processing system (e.g., a transformation unit or associated properties propagation unit). For example, input perimeter guards may take as input data retrieved, accessed or input from devices or media of a computing system and other input, for example a user policy associated with the data or input source. In a similar sense, other policy-related inputs to the input perimeter guard may include safety-related parameters and actions associated with maintaining a safe operating condition for the system under various input data combinations, potentially also taking into account the system's internal state, for example. Based on this aggregated input, the input perimeter guard may then determine whether or not to provide such input data to the transformation unit and, if so, potentially selecting which portions of the input data should be provided to the transformation unit. The input perimeter guard may also determine what the corresponding DAP or DAP's for that input data should be. The input perimeter guard may also determine an enforcement action that should be performed to assure that the associated user policy (or some other constraint such as a system-wide safety policy) is correctly enforced.

Similarly, embodiments of output perimeter guards may receive input data, corresponding DAP's, and a policy. Based on the policy, the data itself and the DAP's associated with that data, an output perimeter guard may produce a corresponding output data derived from the received input data. In this manner, output perimeter guards may be utilized, for example, as enforcers or gates for data output from a processing system (e.g., a transformation unit or associated properties propagation unit). For example, output perimeter guards may take as input data output from the transformation unit and the corresponding DAP output from the properties propagation unit and determine whether to provide that data to an output device (e.g., to output such data to a network connection, store such data on a storage media, etc.).

The output perimeter guard may also determine an enforcement action to assure that specific actions are taken, in order to enforce the associated policy. It will be noted here that the terms input data, input DAP, output data and output DAP are to be taken as descriptive relative to the local block or unit with which the term is used. In other words, the output (e.g., data or DAP) of one block or unit may be utilized as the input (e.g., data or DAP) to another block or unit.

Referring now to FIGS. 12A and 12B, FIG. 12A depicts an embodiment of input perimeter guard ($PG^{in}$) 1200 while FIG. 12B depicts an embodiment of output perimeter guard ($PG^{out}$) 1202. A policy input 1204 is depicted logically and may be realized, for example, as separate input or by sending policy data as $GD^{in}$ potentially together with an appropriate $GDAP^{in}$. Thus, input perimeter guard 1200 may take as input generic data (e.g., generic input data $GD^{in}$) and a policy through policy input 1204. The input perimeter guard 1200 may then produce output generic data $GD^{out}$ and corresponding data associated property $GDAP^{out}$ based on the input generic data and the policy received on policy input 1204. In some embodiments, the input perimeter guard may also determine or output an enforcement action or actions (or log) that may be taken in order to assure that the associated policy is correctly enforced.

Similarly, output perimeter guard 1210 may take as input generic data (e.g., generic input data $GD^{in}$), a generic DAP (e.g., $GDAP^{in}$) and a policy through policy input 1204. The output perimeter guard 1210 may then produce output generic data $GD^{out}$ based on the input generic data, input generic DAP and the policy received on policy input 1204. In some embodiments, the output perimeter guard may also determine an enforcement action (or actions or log) that may be taken in order to assure that the associated policy is correctly enforced. Such policy enforcement action may include operations such as "raise an alarm", "trigger an exception", "trigger an interrupt", "zeroize $GD^{out}$", "stop processing", "encrypt", "no action", "block all outputs", "output log", etc., or some combination thereof, or other enforcement actions.

For these perimeter guards, generic input data $GD^{in}$ may need to be assigned an appropriate GDAP (e.g. $GDAP^{out}$), where appropriate may mean according to a user-defined policy. Examples of such a user policy may include assigning GDAP (e.g., $GDAP^{out}$) based on the source of the $GD^{in}$ (e.g., high confidentiality and low integrity if GD is originating from an internal disk, low integrity and low confidentiality if it is originating from Ethernet, etc.). The source of the $GD^{in}$ can, for example, be determined from placement and connectivity of $PG^{in}$ (e.g., a disk is clearly the source if $PG^{in}$ input $GD^{in}$ is connected only to a disk, etc.), or in case of SoC interconnect interfaces, by monitoring addresses of transactions on the bus, etc.

GDAP (e.g., $GDAP^{out}$) can also be assigned based on the content of $GD^{in}$. One such example is when incoming data GD is cryptographically authenticated. In such cases the signature (e.g., indicating the identity of the sender) of GD may be cryptographically checked (by $PG^{in}$) and assigned $GDAP^{out}$, as defined by a policy (e.g., as an input parameter on the policy block input 1204). As another example, the proposed GDAP may be already embedded in the GD and the combination cryptographically signed. The $PG^{in}$ may then check the signature and, if policy allows, the proposed GDAP may be applied to the $GDAP^{out}$ associated with $GD^{out}$.

In such perimeter guards, the policy (e.g., data) comprises user configurable and system (dependent) parameters (such as the relation R, relation P (e.g., as defined below), decryption/encryption keys, existence/lack of connections, enforcement actions, INF, filters, firewalls, etc.) and may be implemented using hardwired logic, may be runtime configurable or modifiable, may be user definable, etc. or some arbitrary combination thereof.

The policy (e.g., provided on the policy input 1204) may include user supplied sets of rules governing the assignment of GDAP to particular data (or the determination of GD from particular data). More formally, in perimeter guards, the policy is enacted by a k-ary relation P between arbitrary elements from at least two of the following sets: input generic data ($GD^{in}$), input/output generic data associated properties set ($GDAP^{in}/GDAP^{out}$), the policy enforcement action set and other policy data.

In some embodiments, the policy input 1204 may comprise a bus or other logic on which GD is transferred. Thus, for example, the policy data may be transferred to the $PG^{in}/PG^{out}$ on the $GD^{in}$ data bus (potentially with $GDAP^{in}$ as appropriate). The system realization may differentiate the policy data from the rest of the data through the use of certain address memory range, $GDAP^{in}$, separate ports, etc.

Figure 13A:
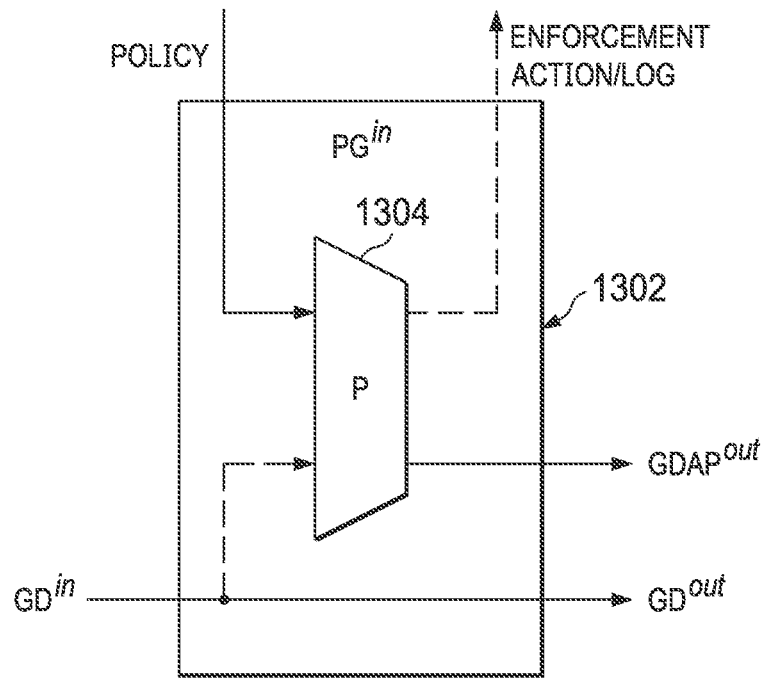
FIGS. 13A and 13B are block diagrams depicting embodiments of input perimeter guards
Figure 13B:
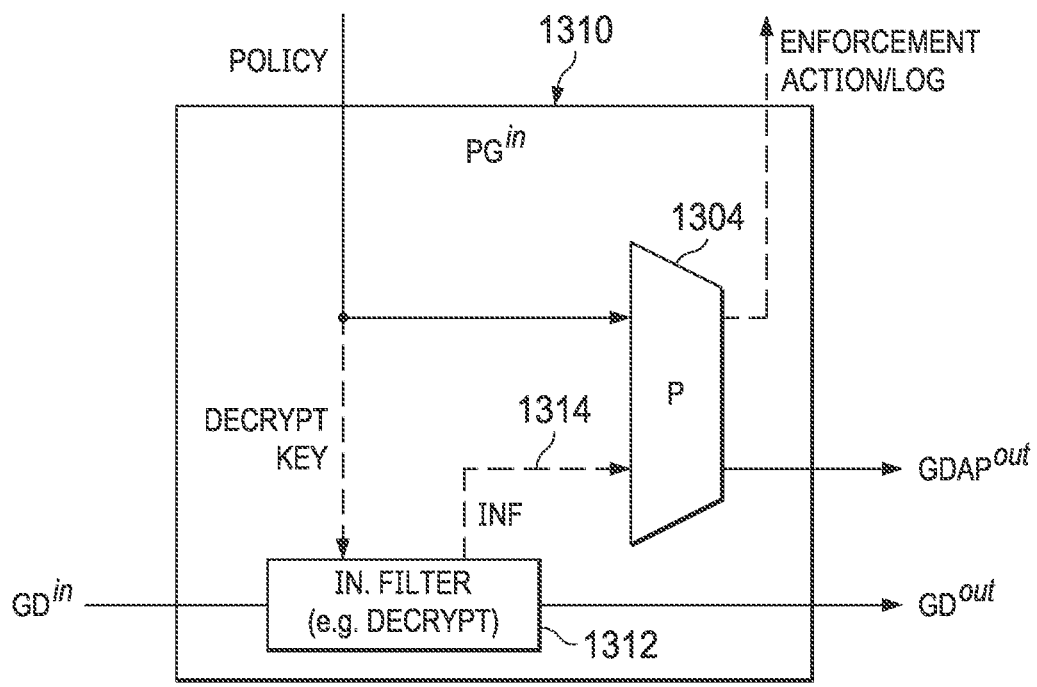

To illustrate an exemplary implementation of such a perimeter guard, the reader's attention is directed to FIGS. 13A and 13B which depict embodiments of input perimeter guards. FIG. 13A depicts an input perimeter guard 1302 $PG^{in}$ where $GDAP^{out}$ (and optionally enforcement action/log) is assigned such that it is in accordance with a policy, captured and enacted by relation P 1304 (and may optionally depend on $GD^{in}$ which may be provided to determine relation P 1304). FIG. 13B depicts an input perimeter guard 1310 $PG^{in}$ where the $GD^{in}$ is processed by IN(put) FILTER 1312 (for example a decryption function, filtering, zeroization, firewall, conversion, identical transformation, or some other filtering function or combination of filtering functions, etc.). The IN FILTER 1312 may have additional input including for example, a DECRYPT KEY (or a list of decryption keys, firewall rules, filtering rules, etc.) that are parameters for the IN FILTER block 1312 and may influence its operation. Thus, for example, the input perimeter guard 1302 may include logic for the IN FILTER 1312 to apply to an input datum to generate the output datum (e.g., by decrypting the input datum using a decryption key). IN FILTER 1312 may have an optional output INF 1314, comprised of $GD^{in}$ or some result of the IN FILTER 1312 operation (for example information about a remote data source's identity, decryption failed information, information about $GD^{in}$ filtering, etc.) The $GDAP^{out}$ or enforcement action/log of perimeter guard 1310 is determined such that it is in relation P 1304 with a policy provided on the policy input and optionally INF 1314.

Thus, as can be seen, embodiments of an input perimeter guard ($PG^{in}$) assigns $GDAP^{out}$ to the $GD^{out}$ such that the $GDAP^{out}$ is in relation P (e.g., specified by an input policy) with $GD^{in}$ and may additionally trigger a policy enforcement action, such that the policy enforcement action to be triggered is in relation P with $GD^{in}$. It is important to note that FIGS. 13A and 13B show policy enforcement action/log which is an optional output from relation P 1304 determination of perimeter guards 1302, 1310. Such a policy enforcement action may alternatively be realized by connecting $PG^{in}$ outputs to the inputs of an additional $PG^{out}$ (e.g., with appropriate policy input). As one such example, confidentiality H is in relation P with $GD^{in}$ with address 0xa000_0000. As another example, confidentiality L and integrity M is in relation P with all the $GD^{in}$. As yet another example: "trigger exception" is in relation P with $GD^{in}$ with address 0xbad_c0de.

Figure 14A:
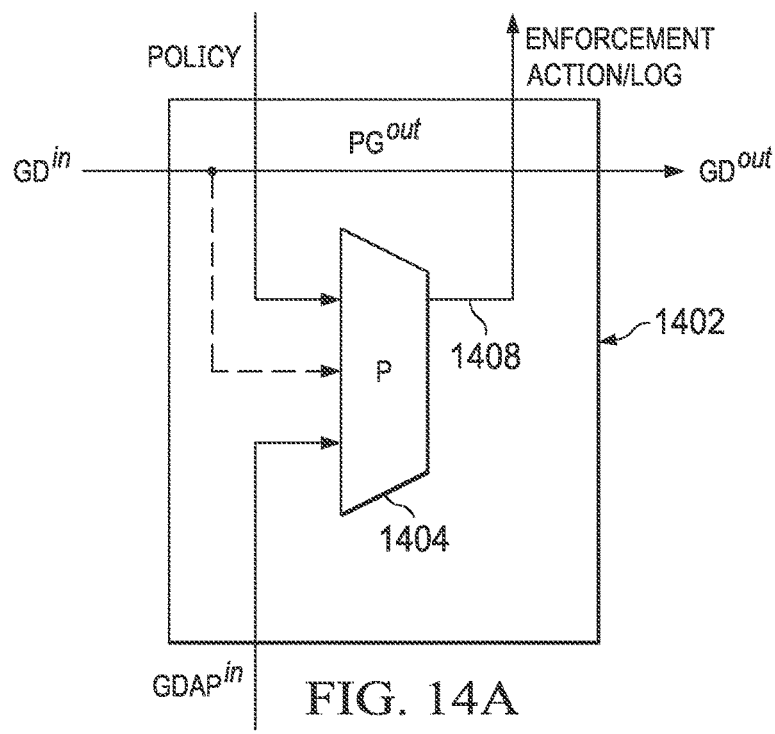
FIGS. 14A, 14B and 14C are block diagrams depicting embodiments of output perimeter guards.
Figure 14B:
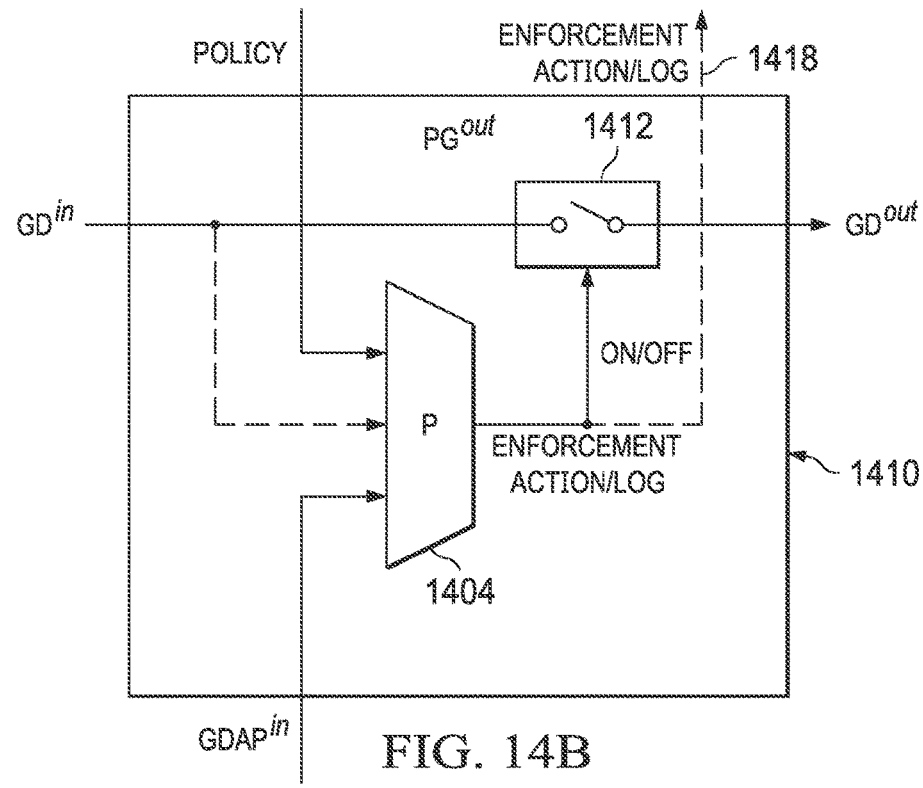
Figure 14C:
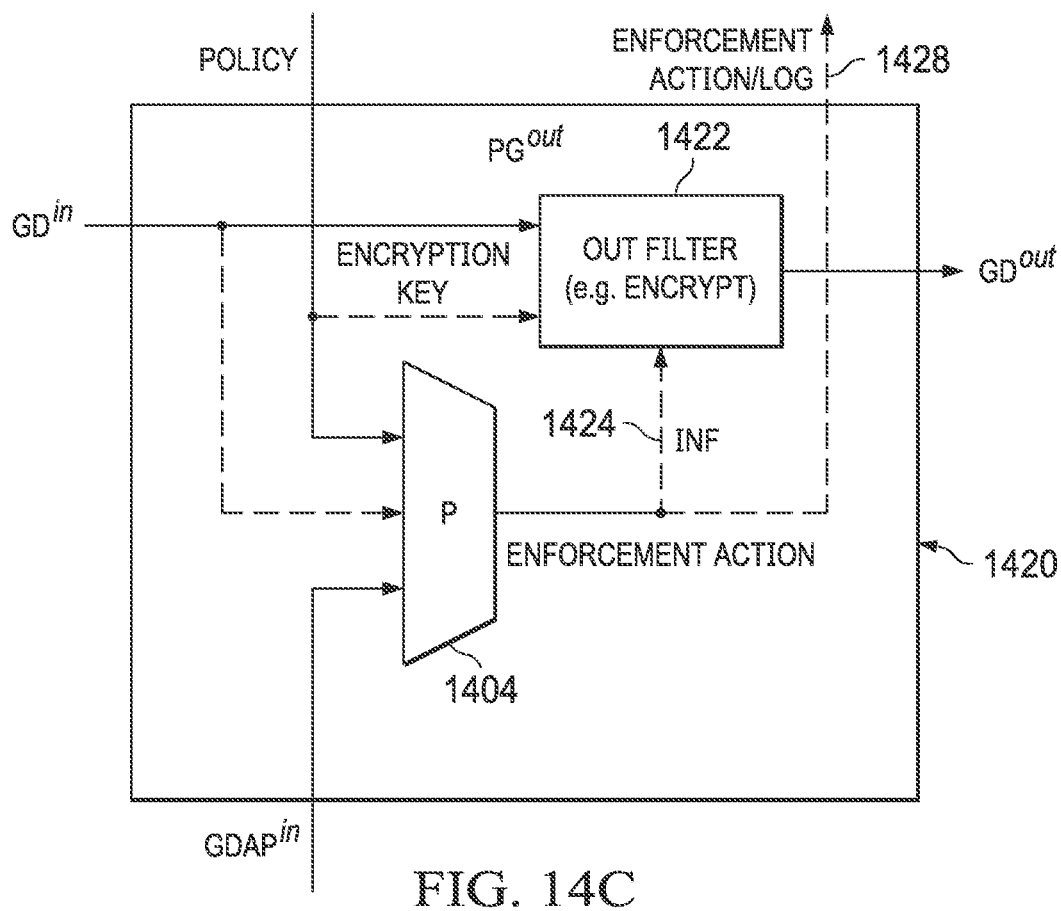

Implementations of perimeter guards are further depicted in FIGS. 14A, 14B and 14C, which illustrate embodiments of output perimeter guards. Referring first to FIG. 14A, an embodiment of an output perimeter guard 1402, where an enforcement action (like exception, zeroization, alarm, etc.) or output of log information 1408 is triggered in accordance with a user-defined policy P 1404 and depending on a provided input $GDAP^{in}$ (and optionally, an input $GD^{in}$).

FIG. 14B depicts an embodiment of an output perimeter guard 1410 where the output ($GD^{out}$) is enabled or disabled (e.g., filtered) by filtering block 1412 in accordance with the user-defined policy P 1404 and depending on an input $GDAP^{in}$ and optionally on an input $GD^{in}$. Optionally, an enforcement action or output of log information 1418 is triggered (e.g., as specified by the policy P 1404).

FIG. 14C depicts an embodiment of an output perimeter guard 1420 where an input $GD^{in}$ is processed (e.g., altered) by an "OUT FILTER" 1422 before being output as $GD^{out}$. The alteration action applied by OUT FILTER 1422 may be any transformation as specified by the policy P 1404 (for example, decryption, filtering, zeroization, firewall, conversion, identical transformation, or another filtering function or combination of filtering functions, etc.). The policy P 1404 may include optional parameters (e.g., an ENCRYPTION KEY, but may also be any other arbitrary parameters, including a list of encryption keys, filtering rules, zeroization rules, etc.) directly passed to the OUT FILTER 1422. The INF 1424 that depends on the policy P 1404, the input $GDAP^{in}$, and optionally the input $GD^{in}$ may be an optional additional input into OUT FILTER 1422. An enforcement action or the output of log information 1428 may also optionally be triggered in accordance with policy P 1404 (e.g., and depending on the input $GDAP^{in}$ or the input $GD^{in}$).

Thus, as can be seen, embodiments of an output perimeter guard ($PG^{out}$) may trigger a policy enforcement action such that the policy enforcement action is in relation P with $GD^{in}$ and $GDAP^{in}$. The policy enforcement may be performed internally in the output perimeter guard $PG^{out}$ itself, externally to the output perimeter guard or in some combination thereof. As one example, the relation P may be such that all policy enforcement actions are in relation with any $GD^{in}$, effectively making the policy enforcement action depend only on $GDAP^{in}$. As another example, the relation P may be expressed in such a way that it requires the $GDAP^{in}$ encoded in $GD^{in}$ to match the actual $GDAP^{in}$.

After a review of the above, embodiments of a system for generating generic DAP's for arbitrary transformation units such as processors or other logic will be understood. Moreover, embodiments of perimeter guards including input perimeter guards and output perimeter guards have been disclosed. As will be recalled, input perimeter guards may receive input data and a policy. Based on the policy and the input data, an input perimeter guard may produce both output data and corresponding DAP's.

In this manner, input perimeter guards may be utilized, for example, as enforcers or gates for data input to a processing system (e.g., a transformation unit or associated properties propagation unit). For example, input perimeter guards may take as input data retrieved, accessed or input from devices or media of a computing system and (e.g., based on a user policy associated with the data or input source) determine whether to provide such data to the transformation unit, what such data should be provided to the transformation unit, or determine what the corresponding DAP for that input data should be. The input perimeter guard may also determine an appropriate enforcement action or actions that should be effected in order to assure that the current policy is correctly enforced.

Similarly, as discussed, embodiments of output perimeter guards may receive input data, a corresponding DAP, and a policy. Based on the policy, optionally the input data and the DAP, an output perimeter guard may produce corresponding output data for the received input data. In this manner, output perimeter guards may be utilized, for example, as enforcers or gates for data output from a processing system (e.g., a transformation unit or associated properties propagation unit). For example, output perimeter guards may take as input data output from the transformation unit and the corresponding DAP output from the properties propagation unit and determine whether to provide that data to an output device (e.g., to output such data on a network, store such data on a storage media, etc.). Embodiments of an output perimeter guard may also determine an appropriate enforcement action that should be effected in order to assure that the associated policy is correctly enforced.

Accordingly, certain embodiments may utilize a properties propagation unit in association with a transformation unit (e.g., a CPU or the like) of a computing system along with zero or more input perimeter guard (or guards) and/or output perimeter guards to enforce one or more user policies on code or data utilized during processing of the computing system and data leaving such a computing system.

Figure 15:
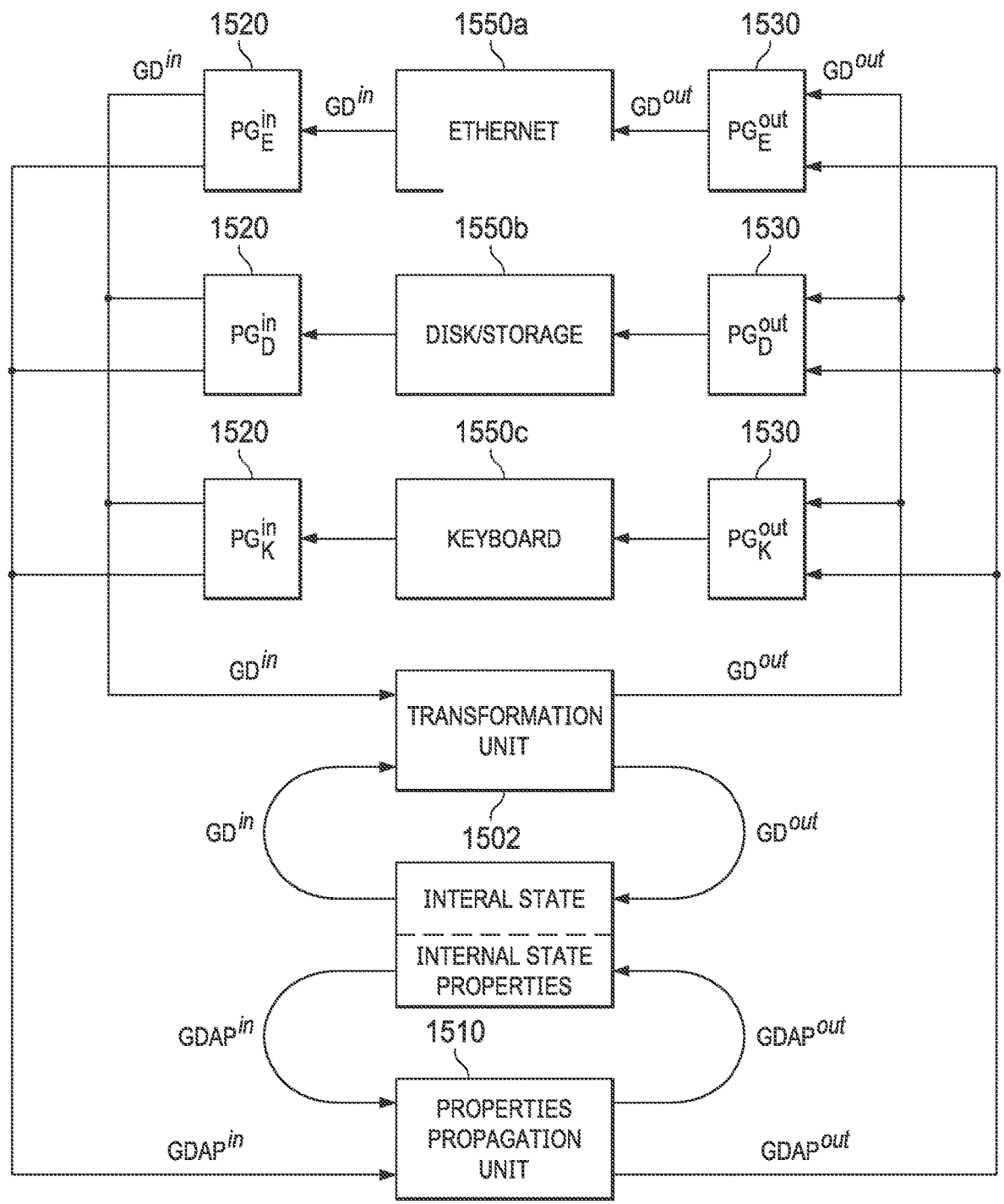
FIG. 15 is a block diagram depicting an embodiment of a computing system.

FIG. 15 depicts an embodiment of such a computing system. The computing system includes a transformation unit 1502 (e.g., such as a CPU or other processor) and a corresponding properties propagation unit 1510. The computing system may have one or more I/O, memory or other types of devices 1550 such that input data (including code) may be provided to the transformation unit 1502 from these devices 1550 for processing and data generated from the transformation unit 1502 provided to these devices 1550 for output. These devices 1550 may include, for example, Ethernet 1550a (or other network connectivity), one or more storage media 1550b (e.g., RAM, disk devices, flash memory, etc.), a keyboard 1550c. Other devices 1550 may be imagined and are fully contemplated herein.

Certain embodiments may include an input perimeter guard 1520 disposed between a device 1550 and the transformation unit 1502 and between the device 1550 and the properties propagation unit 1510, where the input perimeter guard 1520 comprises logic for receiving data from the device 1550 and determining both an input datum and the input DAP corresponding to the input datum, based on a policy. Such a policy may be specific to the device 1550.

In particular, input perimeter guards 1520 may be placed between devices 1550 and input to transformation unit 1502 and properties propagation unit 1510. These input perimeter guards 1520 may take as input data retrieved, accessed or input from devices 1550 of the computing system and determine (e.g., based on a user policy associated with the device 1550) whether to provide such data to the transformation unit 1502, what such data should be provided to the transformation unit, or determine what the corresponding DAP should be for that input data provided to the properties propagation unit 1510. The output of each input perimeter guard 1520 may thus be provided to the transformation unit 1502 and the properties propagation unit 1510. The input perimeter guard may also determine an appropriate enforcement action (or actions) that should be effected to assure that the associated policy is correctly enforced.

As there may be an input perimeter guard 1520 specific to a corresponding device 1550, the policy (and thus the determination of whether to provide such data to the transformation unit 1502, what such data should be provided to the transformation unit 1502, or what the corresponding data associated property for that input data provided to the properties propagation unit 1510 should be) may be tailored to the specific device 1550 of the computing system.

Some embodiments may include an output perimeter guard 1530 disposed between a device 1550 and the transformation unit 1502 and between the device 1550 and the properties propagation unit 1510, wherein the output perimeter guard 1530 comprises logic for receiving the output datum from the transformation unit 1502 and the output DAP corresponding to an output datum from the properties propagation unit 1510 and determining data to provide to the device 1550 based on the output datum, the corresponding output DAP corresponding to the output datum and a policy. This policy may be specific to the device 1550.

Again, output perimeter guards 1530 may be placed between output of transformation unit 1502 and properties propagation unit and devices 1550. These output perimeter guards 1530 may take data output by the transformation unit 1502 and the corresponding DAP output by the properties propagation unit 1510 as input, and based on a policy associated with the device 1550 determine whether to provide that data to the device 1550 (e.g., to output such data on a network, store such data on a storage media, etc.). The output perimeter guard 1530 may also determine an appropriate enforcement action that should be enacted to assure that the associated policy is correctly enforced.

As with the input perimeter guards 1520, there may be an output perimeter guard 1530 specific to a corresponding device 1550, the policy (and thus the determinization of whether to provide such data to the device 1550) may be tailored to the specific device 1550 of the computing system.

As can be seen, certain embodiments may thus enforce an easy-to-understand high level user policy on all code executed in the system and all data leaving the system. To illustrate an example with the depicted computing system, suppose a user policy defines GD as having two assigned properties: confidentiality and integrity. The possible values for confidentiality property comprise the set Sc={c=H, c=L} and possible values for the integrity property comprise the set Si={i=H, i=M, i=L}. Thus, the GDAP of each GD may comprise tuple (c, i), where c is the confidentiality value coming from set Sc and i is the integrity value coming from set Si.

Continuing with the above example, the relation R is a composite of two relations, the relation Rc and the relation Ri. Both are binary relations with the properties of reflexivity, antisymmetry and transitivity. The relation Rc is defined so that (c=H) R (c=L) (the rest follows from the properties: (c=L) R (c=L) and (c=H) R (c=H)). The Ri is defined so that (i=M) R (i=H), (i=L) R (i=M) (and the rest follows from relation properties). The relation R is the relation between tuples (c, i) and the tuple ($c^{out}$, $i^{out}$) is in the relation R with tuple ($c^{in}$, $i^{in}$) if and only if both $c^{out}$ Rc $c^{in}$ and $i^{out}$ Ri $i^{in}$. Note that in this example, the relation R is separable into two independent relations: Rc and Ri.

Further, the high-level user policy may require that no data derived from any keyboard 1550c or storage (e.g., disk) 1550b input into the system ever leaves the system through the Ethernet 1550a and that keyboard 1550c LEDs (controlled through GD output from the system going to the keyboard 1550c) can only be controlled by an input from keyboard 1550c (e.g., by the user pressing a button). This high-level user policy can be captured by the following: $GD^{in}$ from Ethernet 1550a is assigned $GDAP^{in}$ (c=L, i=L), $GD^{in}$ from storage device 1550b is assigned $GDAP^{in}$ (c=H, i=M), $GD^{in}$ from Keyboard 1550c is assigned $GDAP^{in}$ (c=H, i=H), $PG_E^{out}$ triggers an exception policy enforcement action if $GDAP^{out}$ has c=H (regardless of i), and $PG_D^{out}$ triggers a "block the output" enforcement action if $GDAP^{out}$ has i=M or i=L (regardless of c).

Continuing with the example, all relations (e.g., relation R for properties propagation unit and relations for all of the perimeter guards 1520, 1530) are loaded into the computing system and the system is permitted to come out of reset. Due to the properties of relation R, it is possible to reach a conclusion about the GD leaving the system regardless of what and how many transformations were applied to it (e.g., by transformation unit 1502) and regardless of the source of the data which is in its dependency cone starting from reset.

Specifically, GDAP with c=H necessarily means that at least one dependency in at least one transformation of associated GD in the complete dependency cone (from reset) came from either the keyboard 1550c or the storage 1550b (e.g., disk). In other words, the GD was influenced by input from the keyboard 1550c or the storage 1550b (e.g., disk). GDAP with i=H necessarily means that all dependencies of associated GD in its complete dependency cone (from reset) came only from the keyboard 1550c. In other words, no input from either disk or Ethernet c1550a could have influenced such associated GD.

With the above in mind, now consider embodiments of two systems implementing the same functionality and with the same user-supplied policy. Both systems are considered to comply with user policy (e.g., at all times), even if one system exhibits internal policy violations that cannot be detected or exploited externally.

Figure 16:
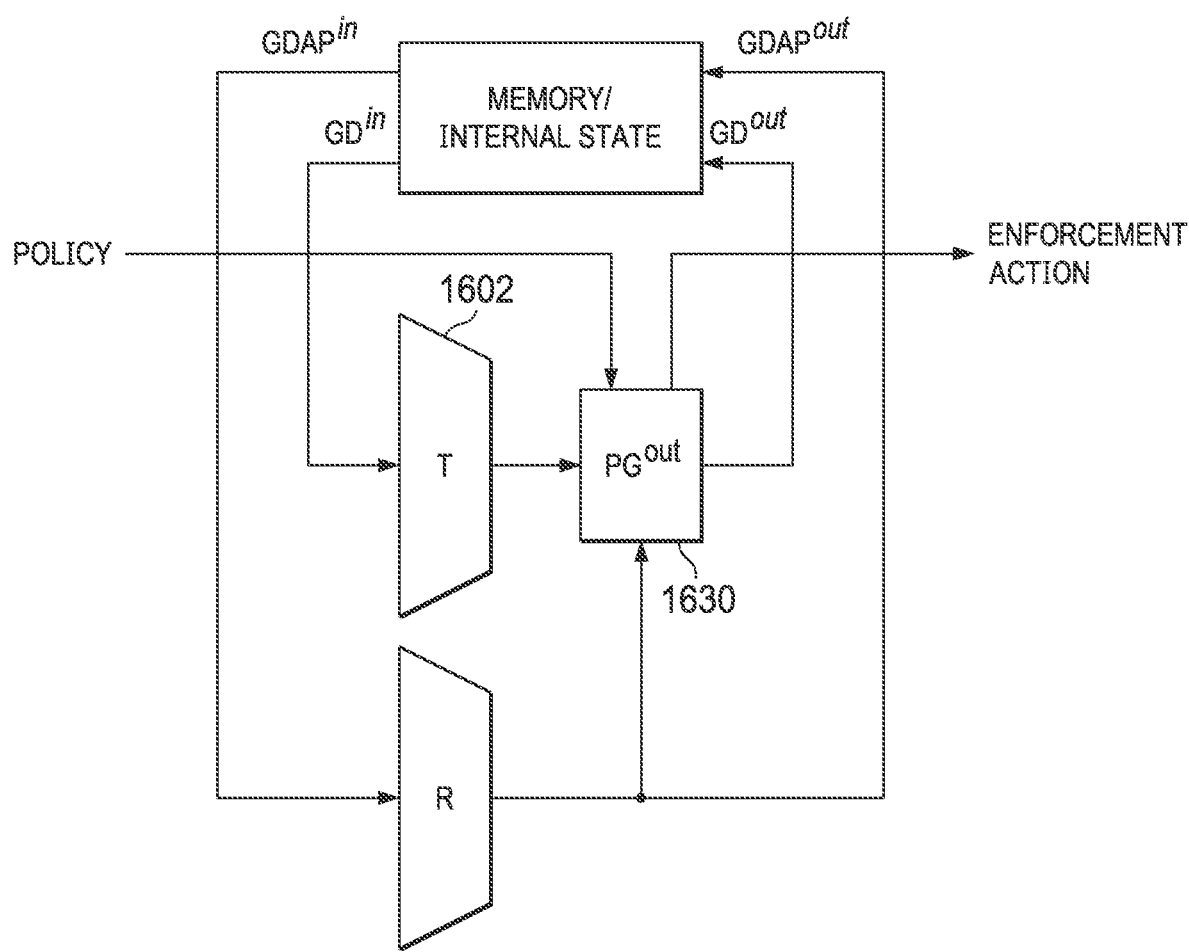
FIGS. 16 and 17A and 17B are block diagrams depicting embodiments of a computing system.
Figure 17A:
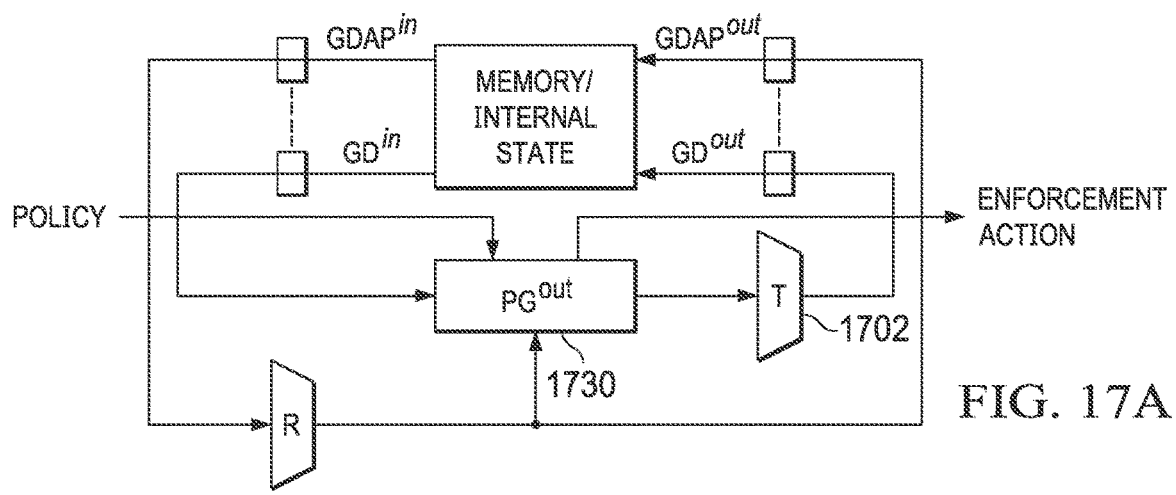
Figure 17B:
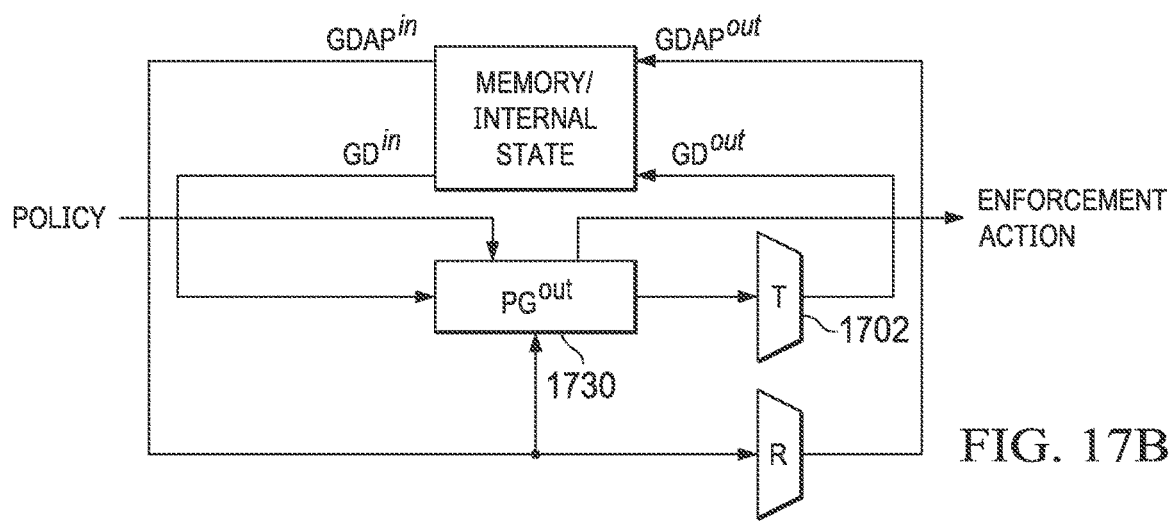

Two embodiments of the realization of these types of computing systems are depicted in FIG. 16 and FIG. 17A and FIG. 17B (collectively FIG. 17). The embodiments depicted in FIG. 16 and FIG. 17 differ in the placement of the $PG^{out}$ block (1630, 1730 respectively) and thus exhibit different operational aspects; in this case, the difference can be seen to be in when the policy enforcement action is performed. For example, in the embodiment depicted in FIG. 16, Late Policy Enforcement (LPE) may be implemented where the $PG^{out}$ block 1630 is placed after the transformation T 1602 and thus, the policy enforcement action can be taken only after the transform T 1602 was already applied. By contrast in FIG. 17, Early Policy Enforcement (EPE) may be implemented where the $PG^{out}$ block 1730 is placed before the transformation T 1702 and thus the policy enforcement action can be taken before the application of transform T 1702. The difference among the embodiments depicted in FIGS. 17A and 17B is that policy violation detection is performed on $GDAP^{out}$ (FIG. 17A) and on $GDAP^{in}$ (FIG. 17B).

Even if one considers a system where the memory is external to the system (which is not the most typical case), it can be seen that the EPE and LPE systems as depicted in FIGS. 16 and 17 can both be implemented in a way such that there is no externally detectable (or exploitable) policy violation. As an example, suppose that the policy is that Transform T must not act on $GD^{in}$ that results in $GDAP^{out}$=HC, and the policy enforcement action is to stop the computing system. In case of an EPE system (e.g., an embodiments of which are depicted in FIG. 17), the transformation T is prevented from acting on $GD^{in}$ when $GDAP^{out}$=HC, while in the case of an LPE system (e.g., embodiment of which is depicted in FIG. 17), the transform T gets applied to $GD^{in}$. However, in this case, the resulting $GD^{out}$ is prevented from leaving the system (in this example, from being written to external memory). If transform T does not leak any (even side channel) information externally, then both systems comply with the policy. However, if transform T leaks some, for example, electromagnetic information or timing information, then the LPE system may violate the policy in a way that is observable externally while the EPE system may not.

It may be useful here to discuss some advantages of embodiments of the computing systems discussed and disclosed herein. As one advantage, dynamic measurements of the system and measurement dependent actions can be performed by choosing the appropriate relation R and policy.

As an example of enforced and measured repeatable execution, the GDAP's include the actual values of some or all GD's (e.g., the values of dependencies fed into transformation unit T, the code, or the instructions). The relation R is defined such that the output of the properties propagation unit is in relation with the input into the properties propagation unit if the output is a one way function (e.g. a hash function) of the inputs. The realization may be such that the properties propagation unit calculates the hash function (which may be cryptographic or non-cryptographic) of some or all GDAP inputs and assigns these calculated values to GDAP output.

This construction can result in a chaining of one way function values (e.g. hash values) through multiple executions (e.g., successive applications of transform T to GD and the relation R to GDAP). Thus, a match of a pre-determined hash value (e.g., pre-determined hash value is contained in the policy or determined through a trusted calculation/execution prior to the current execution time, or a representation of all or part of the policy may be hashed by an independent calculation ahead of time, or the hash value may be calculated by performing the transform T over one or more execution cycles to obtain a "comparison" value, etc.) with a dynamically computed hash value in the current execution thread. This means (subject to the one way function or cryptographic hash function strength) that the two executions have run through the same states (at least as far as the monitored, and thus hashed, dependencies go).

If all of the dependencies are hashed, the output of transform T will be the same in each case of the execution when the hashes match (subject to the birthday bound of the cryptographic hash function or other practical hash function or one way function limitations). It may also prove beneficial to ignore some inputs (dependencies), or their values. Skipping such input values in the hash calculation, or replacing them with a pre-determined value, achieves the effect of masking (e.g., ignoring certain inputs or dependencies). The act of masking is essentially similar in nature to assigning "don't care" values to some inputs. Which inputs and when (and in which step) are to be masked may also be encoded in the GDAPs (which may also be static and thus may be determined ahead-of-time). Masking may also be used to break the chaining of hash values in predetermined places or conditions.

In the case where only code (or instructions) are hashed, it is thus possible to guarantee that the code has not been modified from some previous or original form. In a similar fashion, it is possible to guarantee that the input data was also not modified and thus, that an arbitrary combination of data and code are fixed. This capability makes it possible to accomplish secure boot, measured boot and other similar functionalities that can guarantee un-modified operation of a computing system.

In general, such hash value chaining makes it possible for a system to detect any deviation from a desired dependency graph (or a desired subset thereof) or to enforce that the execution always stays bounded by the desired dependency graph. For example, to enforce that some algorithm is run without modification but on arbitrary data, one may only hash the instructions (code and immediate values) and the address or locations of the (important) input data in the memory space. Of course, it may be important that a given parameter of an algorithm that is loaded from memory has certain value—in which case such value(s) could also be included in the hash calculation. Logging of the hash outputs (which may occur at the end of some computation, periodically, on-demand, etc.) can be used to reveal "fingerprints" of execution, which can be used to detect unwanted tampering of code or data.

Additional properties that may be added to the GDAP and hashed include, for example, the time, either in the form of real-time clock(s), time-stamp(s), incrementing counter(s), instruction counter(s), transformation applications, etc. This way, it is possible to guarantee not only that execution was bound by a certain dependency graph but also that it was bounded by either some predetermined or dynamically-calculated time limits. For example, if the output is not computed within a specified time, the hash of the output may not match the hash given by the policy and thus, a variation in execution time may be detected. This mechanism may be used to detect (and act appropriately on) unwanted context switches, stalling of execution (e.g., due to debugger intervention), unexpected bus contention, unresponsiveness of data sources, non-constant time algorithms, etc.

Tracking of time in GDAP's as described above also enables the measurement of GD "freshness" (when was the GD last altered, read, etc.) and enforcement actions can then be triggered based on this GD "freshness" property. For example, a system design may be desired that stipulates that a certain encryption key (or one or more from a set of keys) cannot be read within certain time frames. Thus, a policy capturing this system design feature can be used to identify and prevent unexpected or unauthorized access to such encryption keys. In an example of a control feedback loop, the freshness of control outputs can be ensured with a time (freshness) GDAP combined with a policy preventing application of a control loop that does not meet the policy-defined "freshness" threshold.

Embodiments as disclosed may also prove useful for functional safety and fault tolerant or redundant systems. Redundant computation (e.g., in time, in space or a combination thereof) is typically used to minimize the chance of mission failures due to various (often external) factors. Examples of such factors include single-event upsets (SEU), radiation, clock glitching, voltage drops, component failure, etc. Thus, embodiments of a system with an integrity GDAP can be constructed where the policy is authored such that only code implementing the required fault tolerant (or redundancy) features can produce outputs with high integrity GDAP. Such high-integrity data may be required in order to control some mission-critical aspect of a system. Also, if a system is designed such that only "high assurance" code can handle high integrity data, a policy can be enacted where exceptions can be triggered in the case of "non-high assurance" code touching any high-integrity data.

Furthermore, spatial redundancy of the transformation T can be enforced by replicating the execution of the transformation T of a transformation unit (for example 3× redundancy T1, T2, T3) and defining a relation R such that the output GDAP is assigned high integrity if all input GDAP's have high integrity, or by applying various other optional requirements, such as: the inputs into T1, T2, T3 must have the same values; the code for all T1, T2, T3 must have the same values; the outputs from T1, T2, T3 must have the same values or at least two of T1, T2, T3 must have the same input and/or output values, where each implementation of T may have a counter of failures (misalignment of results relative to the other implementations of T) and the determination of output GDAP's may take the possibility of failure based on frequency of past failures into account, or where each application of T1, T2, T3 may be timed and the determination of output GDAP's may take difference in application time as indication of possibility of the failure in each of the T1, T2, T3 implementations.

As may be understood, transient faults are usually much more likely and harder to detect than complete failures. For this reason, it often makes sense to implement redundancy in time, through multiple applications of a transformation T (perhaps in the same circuitry) and comparing the results between such iterations. If the results match, it is very unlikely that a transient failure shorter in duration than such multiple transformation applications could have occurred. To enforce such a time dependency, in certain embodiments of a computing system a GDAP may include a property that counts the number of successive transformation applications or a property that counts the number of mismatches between successive transformation applications and then acts on these (for example by assigning higher output integrity property only if the policy defined minimum time redundancy was applied and if number of mismatches is below the policy defined threshold).

Certain embodiments of computing systems according to these principles can also be designed to run periodic self-checks. The elapsed time since such a self-check has been run may be another input into a relation R that is used in the determination of the output data integrity level (or safety level). Another safety feature that can be used is hashing of the executed code (e.g. from a masking event that is used to break the hash chain), to detect if a code fragment (e.g., a sequence of instructions) was executed in an uninterrupted fashion and/or if any changes to any of the code fragments (perhaps due to transient errors) might have occurred.

Accordingly, using a detailed understanding and knowledge of the computing system implementation, it is possible to determine possible failure modes and their failure probabilities. Such data, when captured by a policy (including a relation R) can be used to determine the GDAP's confidence property, which reflects the probability that an undetected failure occurred in the GD's dependency cone. The detection of a low confidence property (as defined by the policy) can be used to trigger an enforcement action resulting in an "error log" action (such as an alert) or even an "enforcement" action (such as an increase in the time/space dependency or a forced recalculation). This enables dynamic assignment of computational resources (represented as a transform T) to achieve safety targets, based on the importance of the data. One such example could be using space and time redundancy to trade off computational power in order to achieve increased safety and the health of the system. Also, if in a triple modular redundancy setup (for example), where one replicated node permanently fails, then the system could compensate for that failure with time redundancy and using only the non-failed node to achieve redundancy requirements.

Thus, embodiments as described above pertain to dynamic system measurement or fault tolerance, functional safety or redundant systems that can be directly used to compare the equivalence of dynamic dependency graphs or their subsets/fragments (in terms of dependencies, depth, time, etc.) in order to determine the equivalence of execution (or subset of execution) between independent systems or parts of the system. They may also be used in general to reason (either formally or informally) about any differences (or lack thereof) between the dependency graphs.

We will now address another potential use case of the system described herein; that of "data unaware computing". We will define such a system as one where the computational operations of the system can be constrained (or enforced) to be carried out in such a manner that the system itself (in part or in whole) is unable to determine (or exfiltrate) either the data upon which it is being instructed to operate nor the output data resulting from the operations themselves. The basic concept has a great utility in the case where, for example, the confidentiality of private data must be maintained even when it is required to be operated upon by non-trusted code, device or public resources (e.g. cloud computing using private data as input). There have been a number of architectures that have been proposed to implement such a system. The simplest of such including the "secure element" systems described earlier and, more recently, so-called "secure enclave" computational models, such as those implemented by Intel's SGX architecture.

However, one of the more difficult issues with implementing such "secure element" systems is how to ensure that the data upon which the system operates is entirely contained within the secure elements' secure boundaries (i.e., that the confidential data is not inadvertently "leaked" to unauthorized observers). This potential leakage can either be a "direct" leak, where the confidential data is exposed or it can be an "indirect" leak, where only certain properties of the confidential data are exposed. In some cases, however, even a small amount of "indirectly leaked" data is enough to compromise the entire private data set; especially when the adversary is in possession of considerable computational resources. As described earlier, most such architectures make use of the concept of "border control", where data from each secure "enclave" is isolated from other secure or non-secure enclaves by means of address space sequestration or segregation. However, as mentioned above, this mechanism depends on a guaranteed secure (and mostly static) implementation of the address space segregation mechanism. This presents problems when the attackers have a vast resource advantage over the enforcers of that protection.

One other method for implementing such a secure computational model is that of so-called "Homomorphic Computation" systems. These are defined as systems where the processing is carried out on the private data while it is still in encrypted form. While ostensibly much more secure than the "secure element" style architectures, there are nonetheless a couple of major weaknesses to such systems. The first weakness is that Homomorphic Computation is inherently inefficient. Its security proofs are bound to setting a strict limitation on the possible Universal Turing Machine operations that may be implemented, and such limitations can cause considerable "expansions" in the number of instructions required to implement some more complex functions. A second disadvantage of Homomorphic systems are that their security proofs are also bound to computational complexity hierarchy assumptions that may or may not hold up in the case where the underlying computational hierarchy collapses. Such a hierarchical collapse could be effected, for example, by the existence of a practical quantum computer capable of running Shor's algorithm.

Figure 18:
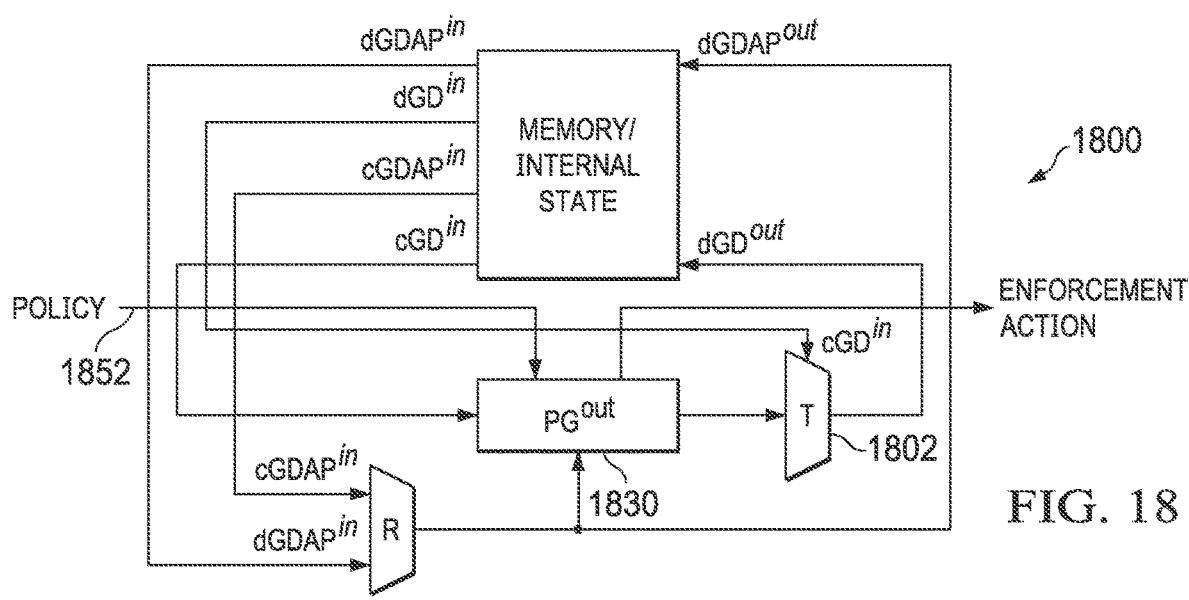
FIG. 18 is a block diagram depicting an embodiment of a computing system for enabling enforced data unaware computing.

Thus, some embodiments disclosed herein may be seen to be useful in the context of enforced data unaware computing. FIG. 18 depicts an embodiment of a system enabling enforced data unaware computing. More specifically in system 1800 the policy 1852 can enable transform T 1802 to operate only on the subset of all possible $dGD^{in}$ based on the transform T 1802 mode of operation as determined by $cGD^{in}$.

It may be understood that at the core of the embodiment of computing systems that enforce data unaware computing concept is a segmentation of the code (e.g., instructions) into different groups that are only allowed (by policy) to operate upon a subset of the data (GD). The data subset is identified by its associated GDAP and the instruction groups are defined by policy. For example, a policy-defined code segment may be grouped together based on knowledge of its transformation unit structure and that amount of data that each group of instructions can potentially leak to an observer. As a more specific example, load and store instructions accessing a processor's (e.g., CPU's) data cache have been shown to leak address information through a cache-timing side channel. Thus, it makes sense to disallow such data cache accesses for a process (or instruction group) that (or potentially only when it) uses high confidentiality data. Alternately, an instruction or mechanism that produces a constant-time access or a single-cycle logic data cache access may be used to mitigate such a side channel leak. One embodiment of exactly how this kind of constant-time access may be achieved is described below, but there are a multiplicity of design options of how such a "timing side channel" leak may be mitigated.

Often is not possible or practical to track everything that can influence the operation of transform T (complete $GD^{in}$ with associated $GDAP^{in}$) or everything that is dependent of an outcome of transform T (complete $GD^{out}$ with associated $GDAP^{out}$). Some example dependencies and leaks/results may include electromagnetic and timing side effects (or side channels), dependencies on all processor internal states (including even "non architectural" states), etc. Here, side effects may be defined as all of the influences and outcomes of (all the GD incoming to or outgoing from) the transform T that do not have assigned and propagated GDAP values.

The consequences of not being able to track and control everything are dependent on the system and its environment. For example, processor hardware may or may not be shielded, fault tolerant, etc., the implementation of the system (for example, is the transform T constant time regardless of all external factors, such as the input data, etc.). As such, systems may or may not be able to control data leakage, data corruption, or control flow corruption, etc. If these factors can be taken into account by the policy, then they may be mitigated by the system.

In embodiments of a system where the amount or type of side effects of the operation of transform T 1802 differ depending on its $GD^{in}$, it is possible for a user to control the side effects (for example side channel data leakage) by way of a user-defined policy in the following manner. Initially, the $cGD^{in}$ subsets of $GD^{in}$ that cause different amounts or types of transform T 1802 side effects can be identifier (the $dGD^{in}$ is subset of $GD^{in}$ such that union of $cGD^{in}$ and $dGD^{in}$ is $GD^{in}$). Each $cGD^{in}$ may be assigned an associated $cGDAP^{in}$ such that different values of $cGDAP^{in}$ reflect different amounts or types of transform T 1802 side effects. A policy 1852 can be assigned that disallows (e.g., triggers an enforcement action, like a system halt) processing of $dGD^{in}$ by transform T 1802 depending on $cGDAP^{in}$. An EPE (early policy enforcement) construction of the system with $PG^{out}$ 1830 enforcing the policy can then be implemented, such that processing of $dGD^{in}$ by transform T 1802 is allowed only in compliance with the policy 1852. The result is that the transform T 1802 (e.g., "code") cannot facilitate leakage of certain (policy-defined) GD through its side-effects.

To illustrate with an example, suppose the system is a CPU and the transform T comprises the following: a data store unit, a (non-constant time) divide unit, a 3 cycle multiply, a single-cycle addition and a single-cycle logical "and" unit. The selection of which unit is active (i.e., performs the transform T) may depend on $cGD^{in}$ (that represents the code). It is worth mentioning that this "code" is not necessarily the same as the "instruction" (or set of instructions) that is used to implement the transform T. An instruction may have some data embedded in it (for example, "add with immediate" (data), as was explained earlier). Thus, in this case, the instruction may comprise both the code (the "control part") and the data. This can also be generalized even further by recalling that the data portion itself may potentially represent any generic data.

In this example, the "logical and" and "addition" operations take the same amount of time to produce the result every time they execute. They are thus, non-distinguishable from a timing perspective. On the other hand it is possible to distinguish between these operations and a multiply (which may take 3 cycles). However, none of these instructions may leak anything regarding the data upon which they operate. On the other hand, the divide operation, where the time taken to achieve a result is data dependent, may leak something about the operands through the "timing" side channel. In the case where there are caches implemented in the system, the "data store" instruction may also leak some information about the destination address to which it is writing, thus potentially leaking information through the "cache timing" side channel.

As such, an example policy can be: "addition", "multiplication" and "logical and" operations are assigned $cGDAP^{in}$=HT, while "store" and "non-constant time divide" are assigned $cGDAP^{in}$=LT. Here, the $dGD^{in}$ with $dGDAP^{in}$=HC (high confidentiality data) may only be handled by transformation T when operating in constant time modes (thus when $cGDAP^{in}$=HT). An example of the relation R that captures such a design intent may be: the Exception (or system halt, etc.) is in relation with $dGDAP^{in}$ equals HC and $cGDAP^{in}$ equals LT. More formally: (enforcement action=exception) R ($dGDAP^{in}$=HC, $cGDAP^{in}$=LT). More concisely (exception) R (HC, LT).

As a further example, in some cases a system may have different types of addition instructions such as "addco" (add with carry output: where the "carry" is not an input, but it is an output), addci (add with carry input: where carry is not an output, but it is an input) or add (where carry is neither an input nor an output). In many transformation units implementing these types of instructions, the carry bit is handled as part of transformation unit's (e.g., ALU or/of CPU) internal state. If the "carry" is considered GD with GDAP, then all of the above "add" implementations may not have side channel leakage effects due to the "carry" operation (since the "carry" may be handled by the system and tracked with GDAP).

However if the "carry" operation is not handled within the system (with GDAP and following properties propagation rules), then: addco may leak information about $GD^{in}$ through the "carry" side channel, the addci instruction is controlled (in part) by the "carry" side channel, while the add instruction is neither controlled by "carry" side channel, nor leaks data through the "carry" side channel. Based on such an analysis, a use-case appropriate policy can be assigned to the system.

The amount and type of transform T side effects are thus highly implementation and system-dependent. This also explains why the policy to handle them must also ultimately be system-dependent. For example, to prevent data leakage through the "carry" side channel in the system described above, the "addco" may not be allowed to operate on $dGD^{in}$ with $dGDAP^{in}$=HC ("high confidentiality") but it is allowed to operate on LC ("low confidentiality") data.

Figure 19:
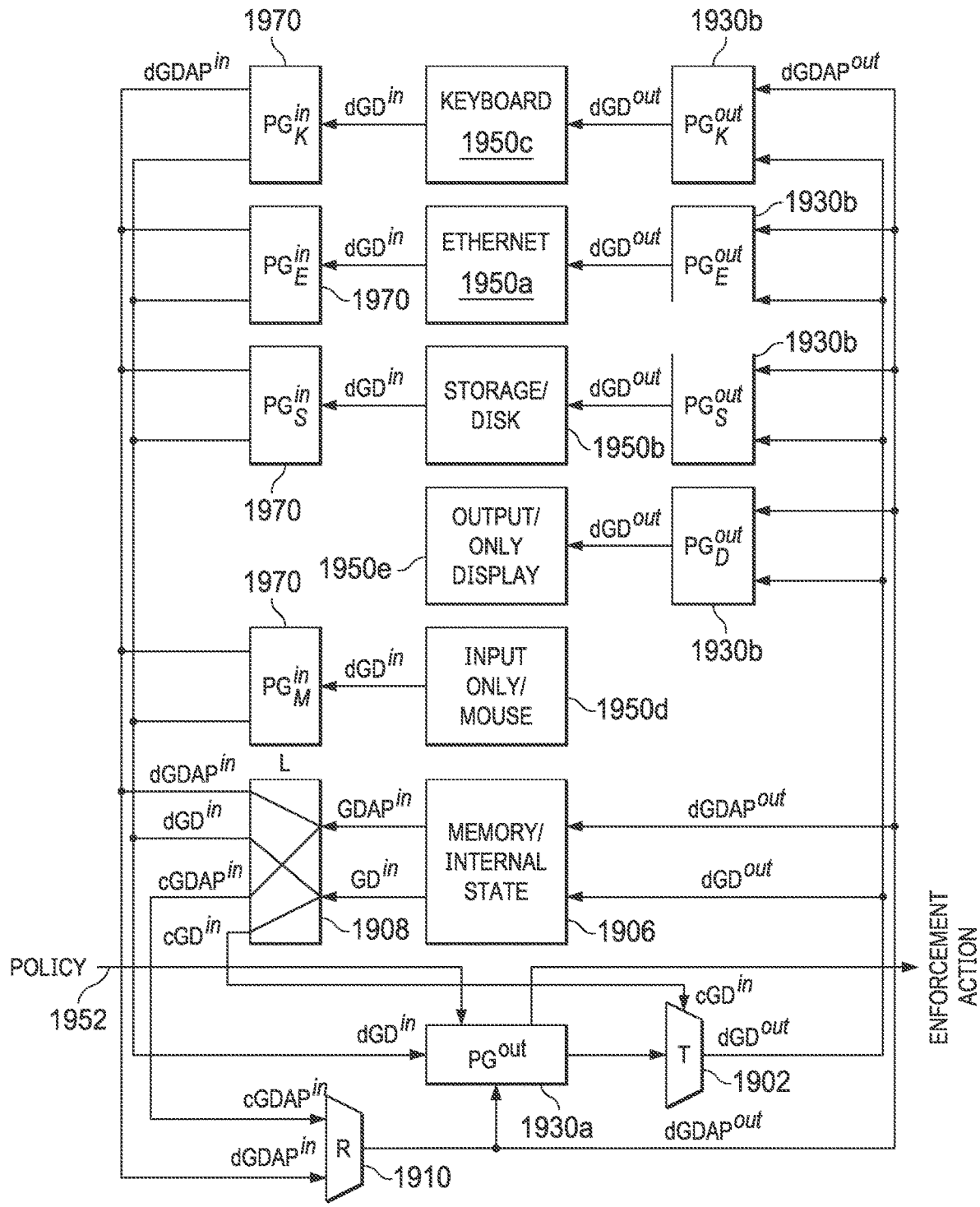
FIG. 19 is a block diagram depicting an embodiment of a computing system.

Turning to FIG. 19, a more detailed example of a computing system according to the embodiments described above is depicted. FIG. 19 depicts an example showing how input only, output only or input/output "legacy" devices not supporting GDAP can be connected to a system. This embodiment also conceptually shows how the "code" and the "data" are handled in a processor or other transformation unit (e.g., GPU, CPU, etc.). The "instructions" may comprise both "code" and "data" (e.g., an immediate value). Ultimately, the bits of information stored in the memory are generic data. How such GD (for example residing in the internal memory) is interpreted (for example as "code" or "data") is determined by generic processor logic in the usual way (e.g., as in any processor). The GD may thus comprise code, data or some combination thereof. For clarity, the GD comprising the "code" is marked as cGD and dGD in the case where it comprises the "data". The cGDAP is GDAP associated with cGD and dDGAP is GDAP associated with cGD.

Here, the computing system includes a transformation unit (T) 1902 (e.g., such as a CPU or other processor) and a corresponding properties propagation unit 1910 (implementing relation R). The computing system may have one or more I/O, memory or other types of devices 1950 such that data (including code) may be provided to the transformation unit 1902 from these devices 1950 for processing and data generated from the transformation unit 1902 provided to these devices 1950. These devices 1950 may include, for example, Ethernet 1950a (e.g., or other network connectivity), one or more storage media 1950b (e.g., RAM, disk devices, flash memory, etc.), a keyboard 1950c, an input only device 1950d like a mouse or the like and an output only device 1950e like a display device or the like. Other devices 1950 may be imagined and are fully contemplated herein.

Input perimeter guards 1970 may be placed between devices 1950 and input to an output perimeter guard ($PG^{out}$) 1930a implementing early policy enforcement based on policy 1952 and a data associated property output by properties propagation unit 1910, and outputting generic data to the transformation unit 1902 and an enforcement action. Input perimeter guards 1970 are also coupled to properties propagation unit 1910.

It will be noted that while the embodiment illustrated depicts one input perimeter guard 1970 $PG^{in}$ connected to one device 1950, it is possible and often practical to have one input perimeter guard 1970 $PG^{in}$ in front of multiple devices 1950). At that point, input perimeter guards 1970 may be assigned the same GDAPs, or appropriate GDAPs may be determined from knowledge of the source or destination of the data. This information may be determined, for example, by monitoring bus transactions and addresses (e.g., a single $PG_{E\&S}{}^{in}$ sitting in front of Ethernet and storage). In other cases, it may be practical to have multiple input perimeter guards 1970 $PG^{in}$ in front of a single device 1950. One example of this scenario may be when a device has multiple interfaces (e.g., a configuration interface and a data interface).

Thus, these input perimeter guards 1970 may take as input data retrieved, accessed or input from devices 1950 of the computing system and determine (e.g., based on a user policy associated with the device 1950) whether to provide such data to the output perimeter guard ($PG^{out}$) 1930a, what subset of such data should be provided to the output perimeter guard ($PG^{out}$) 1930a, or determine what the corresponding data associated property for that input data provided to the output perimeter guard ($PG^{out}$) 1930a should be and provide such data associated properties to the properties propagation unit 1910. The output of each input perimeter guard 1970 may thus be provided to the output perimeter guard ($PG^{out}$) 1930a and the properties propagation unit 1910.

The output of each input perimeter guard 1970 may also be provided to an internal state memory 1906 through logic 1908 which interprets the received input generic data and corresponding data associated property to store the received input generic data and corresponding data associated property in the memory. Thus, internal state memory 1906 may provide a (e.g., previous) generic data to transformation unit 1902 and a corresponding (e.g., previous) data associated property to properties propagation unit 1904.

It will be noted, that as depicted, internal memory 1906 only has $dGD^{out}$ (and $dGDAP^{out}$) and no $cGD^{out}$. However, this does not mean that the "code" cannot be written into internal memory 1906, but it only illustrates that even when processor is writing the code to internal memory, it will most usually be written on the "processor data bus" as data (to appropriate locations and with appropriate properties, etc.) so that it is then interpreted as code, or data, when entering the transformation unit (e.g., the processor). Usually, a processor will have instruction and data busses, where a mixture of code and data (e.g., in the form of immediate values) will enter the processor through the instruction bus (and anything entering instruction bus will be interpreted in the context of instructions). Anything entering and leaving the processor through data busses will generally be interpreted as "data". The data and instruction busses may thus be connected to separate or common memories with orthogonal, overlapping or even common address spaces.

Logic 1908 may thus be processor logic or some other mechanism that separates (determines) how generic data (bits) are to be interpreted: either as code or as data. In practical processors, such logic and mechanisms need not be so localized and are often quite complex and may be intertwined with processor control logic and the various data paths. It is also not necessarily a requirement that the code only originates from internal memory 1906, although this is commonly the case, where the data from an external storage device such as a disk or flash drive is first read from such storage into internal memory and then executed from there. In the case of code execution directly from a device (for example execute-in-place), which is listed in the figure as "storage/disk", logic 1908 would be connected to the output $PG_S^{in}$.

Properties propagation unit 1910 can apply the relation R to generate an output DAP, based on the input DAP supplied from an input perimeter guard 1970 and the input DAP sourced from the internal state memory 1906. Such an output DAP from the properties propagation unit 1910 may be provided to the output perimeter guard ($PG^{out}$) 1930a.

Thus, as discussed, output perimeter guard ($PG^{out}$) 1930a implements early policy enforcement based on policy 1952, the DAP output by properties propagation unit 1910, and outputs generic data to the transformation unit 1902 and the enforcement action. The transformation unit 1902 can thus apply the transform T to the input generic data received from output perimeter guard ($PG^{out}$) 1930a, based on the generic data supplied from the internal state memory 1906 in order to produce an output generic data.

The internal state memory 1906 may receive the output generic data from the transformation unit 1902 and the corresponding DAP generated from the properties propagation unit 1910 and store the generic data and corresponding DAP for use in determining which generic data or DAP to provide at a later point. Additionally, the generic data from the transformation unit 1902 and the corresponding DAP generated from the properties propagation unit 1910 may be received at one or more output perimeter guards 1930b.

These output perimeter guards 1930b may be placed between output of transformation unit 1902 and properties propagation unit 1910 and devices 1950. These output perimeter guards 1930b may take generic data output by the transformation unit 1902 and the corresponding DAP output by the properties propagation unit 1910 as their inputs and, based on a policy associated with the device 1950, determine whether to provide that data to the device 1950 (e.g., to output such data on a network, store such data on a storage media, etc.) or in what form to provide such data (e.g. unchanged, (partially) zeroized, encrypted, etc.).

It will be noted that the embodiments depicted in FIG. 19 and in other figures herein may primarily represent a generic logical structure, which may or may not be similar to a physical (hardware or software) implementation. One possible implementation of the system may be postulated where the system can operate without a dedicated properties propagation unit or perimeter guards. In this case, their logical functions may be performed by the transformation unit T, possibly in a time-sharing manner. In such systems, the application of transformation T (the "mission" or "functional" computations) to obtain output GD's and the application of relation R to determine the output GDAP's may be executed in phases (in time interleaved fashion).

As can be seen from the embodiments depicted, everything received on a functional input of secure systems as disclosed is deemed as data and everything transmitted to any secure device outputs is similarly considered as data. At the time when data enters such a secure system (i.e., it crosses the logically secure boundary), in certain embodiments the input PG's assign the associated data (security) properties to all incoming data in accordance with the security policy of the input perimeter guard. The values of these data security properties may be later reassigned as necessary and appropriate, but in certain embodiments all data inside the logically secure boundary of the secure system will have the following attributes assigned at all times.

A Data Integrity Level (DIL). As the name implies, this is a measure of the integrity of a datum. Instinctively, the integrity of data depends on its source, the method of transport, the integrity of any entity by which it has been manipulated, how it was manipulated, etc. Data may also be assigned a Data Confidentiality Level (DCL). Similarly, this is a measure of the confidentiality of a datum. Instinctively, it also depends on its source, the entity (entities) that have manipulated it, which (collection of) original data source(s) it came from, how any such collection was assembled, etc.

As is well understood in the context of cryptography, data integrity and confidentiality are distinct properties. For example, acting on highly confidential data that has no integrity can cause problems thus it is often assumed that highly confidential data has equally high integrity (loosely, it can be trusted), but that is not always the case. Thus, it may be desired to handle the properties of data integrity and confidentiality differently. For example: Read operations normally don't degrade integrity, write operations do. However, confidentiality is impacted by read operations and (at least indirectly) with writes. Accordingly, it is an important aspect of a secure computing architecture that both of these properties should be tracked and handled.

Additionally, in certain embodiments, everything received on the secure device functional interfaces starts as data and is assigned appropriate data security properties. For purposes of the embodiments as disclosed herein, "code" is a sequence of bits that control the transformations that the device performs. Typically, modern processors have relatively rich and complex instruction set architectures (ISAs); many comprising multiple hundreds of instructions. Furthermore, some instructions may have subtle side effects. For purposes of the embodiments discussed here, instruction dependencies may include everything that influences the instruction results. For example, source registers, source memory locations, various arithmetic statuses like carry, underflow, overflow, etc.). Instruction results include everything that is influenced by an instruction. This means that in any program (sequence of executed instructions with arbitrary data), the execution of an instruction can be indistinguishably replaced by its results.

In principle, all instruction dependencies and results are data and may have appropriate data security properties assigned and properly propagated. However, it may not be necessary nor practical to track all instruction results. Thus, instruction side effects are all observable consequences of executed instructions other than instruction results data that are marked with appropriate data security properties (DIL, DCL). Data invariant instructions are those instructions where nothing about data that they process can be established from observable side effects, and data non-invariant instructions are those instructions where some information about data they processed can be established from the observation of side effects.

Note that the grouping of instructions into Data Invariant and Data Non-Invariant is system-dependent. For example, one practical choice may be implemented as follows: Data Invariant instructions may include constant-time instructions where the instruction results are constrained to only be stored in destination registers, arithmetic flags (that can be treated and tracked as special registers) or comparison flags (that can also be treated and tracked as special registers). Data Non-invariant instructions may include all data-dependent branch instructions, all instructions with data-dependent load/store addresses, all non-constant time instructions, all processor mode-dependent or mode-influencing instructions and in one embodiment, any remaining instructions.

It may thus be a matter of a security policy to assign (e.g., some) instructions as Data Invariant instructions. Data Invariant instructions enable code comprised exclusively of them to perform computations without revealing (or being affected by awareness of) the actual data being processed by the instruction. These aspects are discussed in more detail below.

It may be clear for the discussions herein that Data Invariant instructions can offer higher security guarantees than Data non-invariant instructions. Thus, this difference should be taken into account when defining the following "Code Security Properties"—which may be assigned to all instructions in certain embodiments.

Data Invariant Code Confidentiality Trust Level (DICCTL). This is a measure of how much the code comprised of Data Invariant instructions can be trusted not to leak information. In general, it is impossible to prove that an arbitrary set of code will not ever leak any information. This is why we talk about trust. Obviously, it makes sense to assign the highest trust levels (only) to code that has been formally proven to have desired (security) properties. As an example, by correctly marking data (DCL=N), and with an appropriate Security Policy (for example, no data with DCL>=N can leave the processor), it can be seen that exposing such data to Data Invariant instructions cannot result in a data leak.

Data Invariant Code Minimal Confidentiality Escalation (DICMCE). Any resulting data computed by Data Invariant instructions will have its confidentiality escalated minimally to DCL=DICMCE. As an example, when combining data with some confidentiality, the resulting (combined) data may need to have its confidentiality level escalated.

Data Non-Invariant Code Confidentiality Trust Level (DNCCTL). This is a measure of how much the code comprised of Data Invariant instructions can be trusted not to leak information. It may make sense that DNCCTL<=DICCTL.

Data Non-Invariant Code Minimal Confidentiality Escalation (DNCMCE). Any resulting data computed by Data Non-Invariant instructions will have its confidentiality escalated minimally to DCL=DNCMCE. As an example, when combining data with a given confidentiality level, the resulting (combined) data may need to have a higher confidentiality level assigned to it.

Code Integrity Trust Level (CITL). This is a measure of how much the code can be trusted not to compromise the data integrity. For example, in case of a 2-word counter, a simple re-arrangement of the data words (e.g., swapping low with high) may compromise the data integrity, even if the data's confidentiality level is not affected. For completeness, it should be noted that data read operations normally don't compromise integrity, writes normally do. An example where reads may compromise integrity: multiple reads of magnetic tape storage may degrade it to an extent that the incorrect data is read.

Code Required Data Integrity Level (CRDIL). This makes it possible to set a minimal integrity level of all instruction dependencies for an operation to be carried out. As an example, taking an inappropriate action based on tampered data may be avoided using this mechanism.

Thus, with these definitions in place, it can be described how DIL and DCL are propagated in certain embodiments. Specifically, some embodiments may propagate data associated security properties by assigning all data security properties by an input perimeter guard (PG) and may be later reassigned; all in accordance with the current security policy (e.g., as provided to the input PG). Note that some instructions explicitly (e.g., by instruction immediate values) or implicitly (e.g., for example r0 tied to 0 used as a source operand) contain data. Such data is assigned DIL=CITL and DCL=DNCCTL.

In some embodiments, the following devices operate in a manner that the data security properties propagation, as outlined below, also reflects the data security guaranties given by the device 1. Internal Transport Devices (for example secure interconnects). All data and its data security properties are preserved intact, specifically:
   a. Confidentiality propagation
      $DCL(d^{out})=DCL(d^{in})$, where $d^{in}$ is data on input, and $d^{out}$ is data on output.
   b. Integrity propagation $DIL(d^{out})=DIL(d^{in})$ 2. Internal Processing Devices (for example, a processor or any other HW that modifies data)
   a. Confidentiality propagation in case of a Data Invariant instruction. An exception (error or alert as defined by Policy) is raised in case an instruction does not have sufficiently high DICTL. Otherwise, all instruction results are assigned the highest DCL of all instruction dependencies.

$$DCL(d^{out}) = \begin{cases} \text{exception, if } DICCTL(insn) < \text{MAX}[DCL(d_1^{in}), ..., DCL(d_n^{in})] \\ \text{MAX}[DCL(d_1^{in}), ..., DCL(d_n^{in}), DICMCE(insn)] \end{cases}$$

b. Confidentiality propagation in case of a Data Non-Invariant instruction. An exception (error or alert as defined by Policy) is raised in case an instruction does not have sufficiently high DNCTL. Otherwise all instruction results are assigned the highest DCL of all instruction dependencies.

$$DCL(d^{out}) = \begin{cases} \text{exception, if } DNCTL(insn) < \text{MAX}[DCL(d_1^{in},)..., DCL(d_n^{in})] \\ \text{MAX}[DCL(d_1^{in}), ..., DCL(d_n^{in}), DNCMCE(insn)] \end{cases}$$

c. Integrity propagation. In order for computation to proceed, DIL>=CRDIL on all instruction data dependencies. All instruction results are assigned the lowest DIL of all instruction dependencies.

$$DCL(d^{out}) = \begin{cases} \text{exception, if } CRDIL(insn) < \text{MAX}[DIL(d_1^{in},)..., DIL(d_n^{in})] \\ \text{MAX}[DIL(d_1^{in}), ...DILDCL(d_n^{in}), CITL(insn)] \end{cases}$$

3. Inner Perimeter Guard
   a. If so required by the Security Policy, this may modify data security properties on the data traversing it.
   b. This can be used to isolate internal hardware that is not trusted to fully operate as an Internal Processing Device (e.g., hardware that does not comply with the required data security properties propagation).

4. Outer Perimeter Guard
   a. This assigns data security properties on all incoming data according to the Security Policy of the perimeter guard.
   b. Can block (drop, firewall, etc.) any traversing data, according to the Security Policy
   c. Can trigger alerts to the Policy Manager of any monitored condition (e.g., DCL higher than a threshold).
   d. May cryptographically encrypt, decrypt or authenticate any outbound and/or inbound data, according to the Security Policy.

With the above in mind, it will be recalled that enforced data unaware computing (e.g., through enforced use of data-invariant instructions) may enable efficient confidential data computing without requiring the code itself to be trusted (e.g., not to attempt to exfiltrate confidential data). This efficient confidential data computing may include that the confidentiality of all input data, intermediate results and output resulting data is protected irrespective of code correctness (including potential malicious activities of the code). Moreover, the integrity of the resulting data may be limited by the integrity of all input data and the trust in the code to preserve integrity of data.

Accordingly, assuming correct and trusted transformation unit (e.g., processor) implementation, code comprised of Data Invariant instructions can execute operations on data in the same manner as if it were executed using a fully homomorphic encryption system (although the computations will clearly be much faster). This should be understood from architectural (e.g., software view) point of view. In fully homomorphic encryption case, a processor may not need to be trusted and knowledge of all internal states of processor does not reveal data. In this case however, the processor implementation must be a trusted one.

As an example, untrusted code (e.g., with a minimum DNCCTL and minimum CITL) may be used to perform computations. Here, all data confidentiality may be assured. In any case, computation can be (easily) checked for correctness, and an appropriate checker can be used to raise the integrity level of the resulting data as appropriate.

Accordingly, the system described may be mapped to FIG. 19 in the following way:

$dGD^{in} = \{d_1^{in}, \ldots, d_n^{in}\}$ $dGDAP^{in} = \{DCL(d_1^{in}), \ldots, DCL(d_n^{in}), DIL(d_1^{in}), \ldots, DCL(d_n^{in})\}$ $dGD^{out} = \{d_1^{out}, \ldots, d_n^{out}\}$ $dGDAP^{out} = \{DCL(d_1^{out}), \ldots, DCL(d_n^{out}), DIL(d_1^{out}), \ldots, DCL(d_n^{out})\}$ $cGD^{in} = \{insn\}$ $cGDAP^{in} = \{DICMCE(insn), DNCMCE(insn), CITL(insn)\}$ The relation R is greater-than-or-equal-to for confidentiality and less-than-or-equal-to for integrity (e.g., these can be expressed with MAX and MIN functions as previously discussed). It may be noted that the DICMCE(insn), DICCTL(insn), DNCMCE(insn), DNCTL(insn) CRDIL(insn) and CITL(insn) are assigned by policy. Thus, CITL(insn) <CRDIL(insn), DICMCE(insn)>DICCTL(insn), DNCMCE(insn)>DICCTL(insn) may result in trivial violations of policy as soon as the instruction is encountered. Thus, these cases can be handled by the creation of the policy and thus left out. The policy and the relation R (e.g., implemented in the $PG^{out}$) is such that exceptions or other enforcement actions may be raised appropriately.

As can be seen from the above disclosed embodiments therefore, what has been disclosed are embodiments of a system with a new paradigm for secure or safe computing that allows the security or safety policy of a given data set to be considered separately from both the code base (e.g., the transformation of the input data into output data) as well as the data processing architecture and implementation.

This ability to separate the policy from the data (may include code) and all of these from the data processor design upon which the data is processed is novel and highly useful. In effect, this separation allows for unique opportunities for more rapid security proof evaluations of a given functional system as well as for more simply-expressed security or safety policy proofs themselves.

Moreover, a number of potential implementation options exist for implementing the features of embodiments and for implementing systems that embody such concepts. However, it should be noted that these and other embodiments of the concepts discussed herein can be implemented in many ways without loss of either generality or of functional correctness or completeness. Additionally, several potential utilities for such a novel system have also been disclosed, however, there are many other potential options for utilizing the advances described above in a wide variety of use cases.

More generally then, although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Reference throughout this specification to "one embodiment," "an embodiment," or "a specific embodiment," "a specific implementation," or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including Verilog, C, C++, Java, assembly language, etc. Different programming techniques can be employed such as procedural or object oriented. Data may be stored in a single storage medium or distributed through multiple storage mediums, and may reside in a single database or multiple databases (or other data storage techniques A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed:

1. A system for data driven secure computing, comprising: a computing system including:
   a transformation unit including first logic on a hardware processor for processing input data by applying a transform to a received input datum to generate an output datum corresponding to the received input datum, where the input datum is received at the transformation unit in association with code and the input datum is associated with an input data associated property distinct from that input datum and specific to that input datum; and
   a properties propagation unit distinct from the transformation unit, the properties propagation unit including second logic for receiving the input data associated property associated with the input datum received at the transformation unit and generate an output data associated property corresponding to the output datum generated by the transformation unit based on a policy associated with the input data associated property associated with the input datum received at the transformation unit, wherein the output data by the transformation unit and the output data associated property generated by the properties propagation unit are generated at substantially the same time.

2. The system of claim 1, wherein the code is associated with a segment of code allowed to operate only on a subset of input data that includes the input datum.

3. The system of claim 1, wherein the segment is defined by the policy.

4. The system of claim 3, wherein the segment is based on a timing associated with operations of the transformation unit.

5. The system of claim 4, wherein the code is associated with a load or store.

6. The system of claim 1, wherein a value of the input data associated property is associated with the transform to be applied by the transformation unit.

7. The system of claim 6, wherein the transform is defined by the code.

8. The system of claim 7, wherein the transformation unit comprises multiple logic units and the transform is applied by at least one of the multiple logic units and one or more of the multiple logic unit applies the transform based on the code.

9. The system of claim 7, wherein the transformation unit is a Central Processing Unit (CPU).

10. A method for data driven secure computing, comprising:
    at a transformation unit including first logic:
       processing input data by applying a transform to a received input datum to generate an output datum corresponding to the received input datum, where the input datum is received at the transformation unit in association with code and the input datum is associated with an input data associated property distinct from that input datum and specific to that input datum; and
    at a properties propagation unit distinct from the transformation unit and including second logic for receiving the input data associated property associated with the input datum received at the transformation unit:
       generating an output data associated property corresponding to, and synchronized with, the output datum is generated by the transformation unit based on a policy associated with the input data associated property associated with the input datum received at the transformation unit, wherein the output data by the transformation unit and the output data associated property generated by the properties propagation unit are generated at substantially the same time.

11. The method of claim 10, wherein the code is associated with a segment of code allowed to operate only on a subset of input data that includes the input datum.

12. The method of claim 10, wherein the segment is defined by the policy.

13. The method of claim 12, wherein the segment is based on a timing associated with operations of the transformation unit.

14. The method of claim 13, wherein the code is associated with a load or store.

15. The method of claim 10, wherein a value of the input data associated property is associated with the transform to be applied by the transformation unit.

16. The method of claim 15, wherein the transform is defined by the code.

17. The method of claim 16, wherein the transformation unit comprises multiple logic units and the transform is applied by at least one of the multiple logic units and one or more of the multiple logic unit applies the transform based on the code.

18. The method of claim 16, wherein the transformation unit is a Central Processing Unit (CPU).

\* \* \* \* \*